(12) United States Patent
Yancey et al.

(10) Patent No.: US 7,921,323 B2
(45) Date of Patent: Apr. 5, 2011

(54) RECONFIGURABLE COMMUNICATIONS INFRASTRUCTURE FOR ASIC NETWORKS

(75) Inventors: Jerry W. Yancey, Rockwall, TX (US); Yea Zong Kuo, Rockwall, TX (US)

(73) Assignee: L-3 Communications Integrated Systems, L.P., Greenville, TX (US)

( * ) Notice: Subject to any disclaimer, the term of this patent is extended or adjusted under 35 U.S.C. 154(b) by 1104 days.

(21) Appl. No.: 11/600,934

(22) Filed: Nov. 16, 2006

(65) Prior Publication Data

US 2007/0101242 A1    May 3, 2007

Related U.S. Application Data

(63) Continuation-in-part of application No. 10/843,226, filed on May 11, 2004, now Pat. No. 7,444,454.

(51) Int. Cl.
*G06F 13/00* (2006.01)
(52) U.S. Cl. .......................................................... 714/4
(58) Field of Classification Search .................... 714/4, 5
See application file for complete search history.

(56) References Cited

U.S. PATENT DOCUMENTS

| | | | |
|---|---|---|---|
| 4,528,658 A | 7/1985 | Israel | |
| 5,737,235 A | 4/1998 | Kean et al. | |
| 5,802,290 A * | 9/1998 | Casselman | 709/201 |
| 5,838,167 A | 11/1998 | Erickson et al. | |
| 5,931,959 A * | 8/1999 | Kwiat | 714/48 |
| 5,941,988 A | 8/1999 | Bhagwat et al. | |
| 5,953,372 A | 9/1999 | Virzi | |
| 6,020,755 A | 2/2000 | Andrews et al. | |
| 6,075,380 A | 6/2000 | Lane | |
| 6,172,927 B1 | 1/2001 | Taylor | |
| 6,201,829 B1 | 3/2001 | Schneider | |
| 6,233,704 B1 | 5/2001 | Scott et al. | |
| 6,259,693 B1 | 7/2001 | Ganmukhi et al. | |
| 6,292,923 B1 | 9/2001 | Genrich et al. | |
| 6,333,641 B1 | 12/2001 | Wasson | |
| 6,339,819 B1 * | 1/2002 | Huppenthal et al. | 712/16 |
| 6,381,238 B1 | 4/2002 | Hluchyj | |
| 6,385,236 B1 | 5/2002 | Chen | |
| 6,389,379 B1 | 5/2002 | Lin et al. | |
| 6,421,251 B1 | 7/2002 | Lin | |
| 6,496,291 B1 | 12/2002 | Raj et al. | |

(Continued)

FOREIGN PATENT DOCUMENTS

GB        2377138 A    12/2002

OTHER PUBLICATIONS

Search Report, PCT/US07/23700; Apr. 18, 2008; 2 pgs.

(Continued)

*Primary Examiner* — Stephen M Baker
(74) *Attorney, Agent, or Firm* — O'Keefe, Egan, Peterman & Enders LLP

(57) ABSTRACT

Reconfigurable communications infrastructures may be implemented to interconnect ASIC devices (e.g., FPGAs) and other computing and input/output devices using high bandwidth interconnection mediums. The computing and input/output devices may be positioned in locations that are physically segregated from each other, and/or may be provided to project a reconfigurable network across a wide area. The reconfigurable communications infrastructures may be implemented to allow such computing and input/output devices to be used in different arrangements and applications, e.g., for use in any application where a large array of ASIC devices may be usefully employed such as supercomputing, etc.

34 Claims, 18 Drawing Sheets

U.S. PATENT DOCUMENTS

| | | | |
|---|---|---|---|
| 6,496,505 | B2 | 12/2002 | La Porta et al. |
| 6,614,267 | B2* | 9/2003 | Taguchi ........................ 326/101 |
| 6,617,877 | B1 | 9/2003 | Cory et al. |
| 6,651,225 | B1 | 11/2003 | Lin et al. |
| 6,668,361 | B2* | 12/2003 | Bailis et al. ........................ 716/4 |
| 6,721,313 | B1 | 4/2004 | Van Duyne |
| 6,754,881 | B2* | 6/2004 | Kuhlmann et al. ............. 716/16 |
| 6,873,180 | B2 | 3/2005 | Bentz |
| 6,888,376 | B1 | 5/2005 | Venkata et al. |
| 6,901,072 | B1 | 5/2005 | Wong |
| 6,934,763 | B2 | 8/2005 | Kubota et al. |
| 6,965,571 | B2 | 11/2005 | Webber |
| 6,993,032 | B1 | 1/2006 | Dammann et al. |
| 7,003,585 | B2 | 2/2006 | Phong et al. |
| 7,020,147 | B1 | 3/2006 | Amadon et al. |
| 7,035,228 | B2 | 4/2006 | Baumer |
| 7,111,110 | B1 | 9/2006 | Pedersen |
| 7,137,048 | B2 | 11/2006 | Zerbe et al. |
| 7,188,283 | B1 | 3/2007 | Shafer et al. |
| 7,224,184 | B1 | 5/2007 | Levi et al. |
| 7,260,650 | B1 | 8/2007 | Lueckenhoff |
| 7,389,487 | B1* | 6/2008 | Chan et al. ........................ 716/17 |
| 7,404,170 | B2* | 7/2008 | Schott et al. .................... 716/16 |
| 7,415,331 | B2* | 8/2008 | Dapp et al. ....................... 701/25 |
| 7,439,763 | B1* | 10/2008 | Kavipurapu et al. ............ 326/38 |
| 7,453,899 | B1* | 11/2008 | Vaida et al. .................... 370/419 |
| 7,506,297 | B2* | 3/2009 | Mukherjee et al. .............. 716/18 |
| 7,518,396 | B1 | 4/2009 | Kondapalli et al. |
| 2002/0021680 | A1 | 2/2002 | Chen |
| 2002/0057657 | A1 | 5/2002 | La Porta et al. |
| 2002/0059274 | A1 | 5/2002 | Hartsell et al. |
| 2002/0095400 | A1 | 7/2002 | Johnson et al. |
| 2003/0009585 | A1 | 1/2003 | Antoine et al. |
| 2003/0026260 | A1 | 2/2003 | Ogasawara et al. |
| 2003/0167340 | A1 | 9/2003 | Jonsson |
| 2004/0085902 | A1 | 5/2004 | Miller et al. |
| 2004/0131072 | A1 | 7/2004 | Khan et al. |
| 2004/0156368 | A1 | 8/2004 | Barri et al. |
| 2004/0158784 | A1 | 8/2004 | Abuhamdeh et al. |
| 2004/0240468 | A1 | 12/2004 | Chin et al. |
| 2004/0249964 | A1 | 12/2004 | Mougel |
| 2005/0044439 | A1 | 2/2005 | Shatas et al. |
| 2005/0169311 | A1 | 8/2005 | Millet et al. |
| 2005/0175018 | A1 | 8/2005 | Wong |
| 2005/0183042 | A1 | 8/2005 | Vogel et al. |
| 2005/0242834 | A1 | 11/2005 | Vadi et al. |
| 2005/0248364 | A1 | 11/2005 | Vadi et al. |
| 2005/0256969 | A1 | 11/2005 | Yancey et al. |
| 2006/0002386 | A1 | 1/2006 | Yik et al. |

OTHER PUBLICATIONS

Copending U.S. Appl. No. 11/600,935; entitled "Methods and Systems for Relaying Data Packets", filed Nov. 16, 2006; 101 pgs.

Laxdal, "ELEC 563 Project Reconfigurable Computers", http://www.ece.uvic.ca/~elaxdal/Elec563/reconfigurable_computers.html; printed from the Internet Dec. 19, 2003, Dec. 2, 1999, 10 pgs.

"PCI/DSP-4 Four Complete Channels Of Digital Acoustic Emission Data Acquisition On A Single Board", http://www.pacndt.com/products/Multichannel/pcidsp.html, printed from the Internet Dec. 19, 2003, 3 pgs.

Zaiq Technologies, "Innovation: Methodology Briefs", http://www.zaiqtech.com/innovation/m_fpga.html, printed from the Internet Jan. 15, 2004, 12 pgs.

Hardt et al, "Flysig: Dataflow Oriented Delay-Insensitive Processor for Rapid Prototyping of Signal Processing", (obtained from Internet Dec. 2003), 6 pgs.

Chang et al., "Evaluation of Large Matrix Operations on a Reconfigurable Computing Platform for High Performance Scientific Computations," (obtained from Internet Dec. 2003), 10 pgs.

Alfke, "FPGA Configuration Guidelines," XAPP, 090 Nov. 24, 1997, Version 1.1, pp. 31-38.

"XC18V00 Series of In-System Programmable Configuration PROMs", Xilinx Product Specification, DS026 (v.3.0), Nov. 12, 2001, 19 pgs.

Thacker, "System ACE Technology: Configuration Manager Breakthrough", New Technology, FPGA Configuration, Xcell Journal, Summer 2001, pp. 52-55.

"System ACE MPM Solution", Xilinx Product Specification, DS087 (v1.0) Sep. 25, 2001, 29 pgs.

"RapidIO™: An Embedded System Component Network Architecture", Architecture and Systems Platforms, Feb. 22, 2000, 25 pgs.

"Raceway Internlink Functional Specification", Mercury Computer Systems, Inc., Nov. 8, 2000, 118 pgs.

"[XMC-3310] High Speed Transceiver ePMC Module", Spectrum Signal Processing, http://www.spectrumsignal.com/Products/_Datasheets/XMC-3310_datasheet.asp, (© 2002-2004), 5 pgs. (this reference describes a product available prior to the May 11, 2004 filing date of the present application).

"XMC-3310 High Speed Transceiver ePMC Module", Spectrum Signal Processing, Rev. May 2004, 4 pgs. (this reference describes a product available prior to the May 11, 2004 filing date of the present application).

RocketIO™ Transceiver User Guide, Xilinx, UG024 (v2.3) Feb. 24, 2004, 152 pgs.

"The FPGA Systems Connectivity Tool", Product Brief, Nallatech, DIMEtalk 2.1, Feb. 2004, pp. 1-8.

B. Hall, "BTeV Front End Readout & Links", BTEV Co., Aug. 17, 2000, 11 pgs.

Irwin, "Usage Models for Multi-Gigabit Serial Transceivers", Xilinx, xilinix.com, White Paper, WP157 (v1.0), Mar. 15, 2002, 10 pgs.

Campenhout, "Computing Structures and Optical Interconnect: Friends or Foes?", Department of Electronics and Information Systems, Ghent University, Obtained from Internet Oct. 8, 2006, 11 pgs.

E. Hazen, "HCAL HO Trigger Link", Optical SLB-HTR Interface Specification, May 24, 2006, 4 pgs.

G. Russell, "Analysis and Modelling of Optically Interconnected Computing Systems", School of Engineering and Physical Sciences, Heriot-Watt University, May 2004, 170 pgs.

Copending U.S. Appl. No. 11/529,712; entitled "Systems and Methods for Interconnection of Multiple FPGA Devices", filed Sep. 28, 2006; 42 pgs.

Copending U.S. Appl. No. 11/529,713; entitled "Systems and Methods for Interconnection of Multiple FPGA Devices", filed Sep. 28, 2006; 42 pgs.

Yancey et al, "Systems and Methods for Data Transfer", U.S. Appl. No. 11/529,713, filed Sep. 28, 2006, Preliminary Amendment; Dec. 22, 2006, 11 pgs.

Yancey et al, "Systems and Methods for Data Transfer", U.S. Appl. No. 11/529,713, filed Sep. 28, 2006, Office Action, Feb. 19, 2009, 12 pgs.

Yancey et al, "Systems and Methods for Data Transfer", U.S. Appl. No. 11/529,713, filed Sep. 28, 2006, Amendment; Response to Office Action, May 19, 2009, 17 pgs.

Yancey et al, "Systems and Methods for Data Transfer", U.S. Appl. No. 11/529,713, filed Sep. 28, 2006, Office Action, Aug. 19, 2009, 5 pgs.

Yancey et al, "Systems and Methods for Data Transfer", U.S. Appl. No. 11/529,713, filed Sep. 28, 2006, Response to Office Action, Aug. 25, 2009, 4 pgs.

Yancey et al, "Systems and Methods for Data Transfer", U.S. Appl. No. 11/529,713, filed Sep. 28, 2006, Office Action, Oct. 2, 2009, 3 pgs.

Yancey et al, "Systems and Methods for Data Transfer", U.S. Appl. No. 11/529,713, filed Sep. 28, 2006, Response to Advisory Action, Oct. 14, 2009, 4 pgs.

Yancey et al, "Systems and Methods for Data Transfer", U.S. Appl. No. 11/529,713, filed Sep. 28, 2006, Notice of Allowance and Fees Due, Dec. 4, 2009, 4 pgs.

Yancey et al, "Systems and Methods for Interconnection of Multiple FPGA Devices", U.S. Appl. No. 10/843,226, filed May 11, 2004, Preliminary Amendment, Nov. 14, 2006, 19 pgs.

Yancey et al, "Systems and Methods for Interconnection of Multiple FPGA Devices", U.S. Appl. No. 10/843,226, filed May 11, 2004, Second Preliminary Amendment, Nov. 29, 2006, 3 pgs.

Yancey et al, "Systems and Methods for Interconnection of Multiple FPGA Devices", U.S. Appl. No. 10/843,226, filed May 11, 2004, Office Action, Jan. 4, 2007, 25 pgs.

Yancey et al, "Systems and Methods for Interconnection of Multiple FPGA Devices", U.S. Appl. No. 10/843,226, filed May 11, 2004, Amendment and response to Office Action, May 4, 2007, 32 pgs.

Yancey et al, "Systems and Methods for Interconnection of Multiple FPGA Devices", U.S. Appl. No. 10/843,226, filed May 11, 2004, Office Action, Jul. 27, 2007, 29 pgs.

Yancey et al, "Systems and Methods for Interconnection of Multiple FPGA Devices", U.S. Appl. No. 10/843,226, filed May 11, 2004, Amendment and Response to Office Action, Sep. 27, 2007, 37 pgs.

Yancey et al, "Systems and Methods for Interconnection of Multiple FPGA Devices", U.S. Appl. No. 10/843,226, filed May 11, 2004, Office Action, Nov. 6, 2007, 26 pgs.

Yancey et al, "Systems and Methods for Interconnection of Multiple FPGA Devices", U.S. Appl. No. 10/843,226, filed May 11, 2004, Amendment and Response to Office Action, Apr. 16, 2008, 46 pgs.

Yancey et al, "Systems and Methods for Interconnection of Multiple FPGA Devices", U.S. Appl. No. 10/843,226, filed May 11, 2004, Notice of Allowance and Fees Due, Jul. 23, 2008, 11 pgs.

Yancey et al, "Systems and Methods for Writing Data With a Fifo Interface", U.S. Appl. No. 11/529,712, filed Sep. 28, 2006, Preliminary Amendment, Dec. 7, 2006, 13 pgs.

Yancey et al, "Systems and Methods for Writing Data With a Fifo Interface", U.S. Appl. No. 11/529,712, filed Sep. 28, 2006, Office Action, Apr. 27, 2007, 17 pgs.

Yancey et al, "Systems and Methods for Writing Data With a Fifo Interface", U.S. Appl. No. 11/529,712, filed Sep. 28, 2006, Amendment and Response to Office Action, Jul. 25, 2007, 19 pgs.

Yancey et al, "Systems and Methods for Writing Data With a Fifo Interface", U.S. Appl. No. 11/529,712, filed Sep. 28, 2006, Office Action, Oct. 22, 2007, 17 pgs.

Yancey et al, "Systems and Methods for Writing Data With a Fifo Interface", U.S. Appl. No. 11/529,712, filed Sep. 28, 2006, RCE and Amendment, Mar. 19, 2008, 26 pgs.

Yancey et al, "Systems and Methods for Writing Data With a Fifo Interface", U.S. Appl. No. 11/529,712, filed Sep. 28, 2006, Notice of Allowance and Fees Due, May 30, 2008, 7 pgs.

* cited by examiner

| Header | | | | | | | |
|---|---|---|---|---|---|---|---|
| Source FPGA | Source | Destination FPGA | Destination | | Packet Type | Words to Follow | Lock |
| 31 30 | 29 26 | 25 22 | 21 | 12 | 11 | 10 9 | 0 |
| 00 - FPGA 1<br>01 - FPGA 2<br>10 - FPGA 3<br>11 - FPGA 4 | 0000 - MGT1<br>0001 - MGT2<br>0010 - MGT3<br>0011 - PPC1<br>0100 - PPC2<br>0101 - VME<br>0110 - Race++<br>0111 - PCI<br>1000 - LVDS<br>1001 - User | 25 - FPGA 1<br>24 - FPGA 2<br>23 - FPGA 3<br>22 - FPGA 4 | 21 - MGT1<br>20 - MGT2<br>19 - MGT3<br>18 - PPC1<br>17 - PPC2<br>16 - VME<br>15 - Race++<br>14 - PCI<br>13 - LVDS<br>12 - User | | 0 - Data<br>1 - Control | 3 - 510 | 0 - Open<br>1 - Locked |

RECONFIGURABLE COMMUNICATIONS INFRASTRUCTURE FOR ASIC NETWORKS

This patent application is a continuation-in-part of U.S. patent application Ser. No. 10/843,226, titled "SYSTEMS AND METHODS FOR NETWORKING MULTIPLE FPGA DEVICES," by Jerry W. Yancey, et al., filed on May 11, 2004 now U.S. Pat. No. 7,444,454, and which is incorporated herein by reference in its entirety.

BACKGROUND OF THE INVENTION

1. Field of the Invention

This invention relates generally to interconnection of multiple electrical devices, and more particularly to interconnection of multiple ASIC devices, for example, multiple Field Programmable Gate Array (FPGA) devices.

2. Description of the Related Art

In the past, multiple FPGA devices have been interconnected as an array on a single circuit card using point-to-point or bussed parallel wiring configurations. Such configurations use many wires (along with associated I/O counts and termination components) to achieve required data transfer bandwidths, thus requiring the creation of many connection layers on a circuit card leading to undesirable outcomes such as a high degree of mechanical complexity and cost. Examples of these parallel interfaces include those using signaling standards such as Gunning Transceiver Logic ("GTL"), Stub-Series Termination Logic ("SSTL"), and High-Speed Transceiver Logic ("HSTL"). Some of these standards require as many as three termination components per signal to implement.

Additional parallel wiring is typically employed when a FPGA array is used to implement multiple card-level interfaces and embedded processor nodes, further increasing circuit complexity. In addition, diverse types of interfaces (VME64x, Race++, and PCI), processors and user hardware modules are often required to communicate with each other on a single card, further complicating inter-card communications issues. For example, current commercial products commonly bridge two standard interfaces together, such as VERSA-Module Europe ("VME") and Peripheral Component Interconnect ("PCI") interfaces using parallel bridging chips. Additionally, system-level FPGAs with embedded Power PC ("PPC") or similar functions require implementation of more processing and interface nodes on a single card. Banking of I/O pins has reduced the need for termination components, but large I/O counts still require many layers to route, driving printed circuit board ("PCB") layer counts and costs upward.

In addition to parallel wiring configurations, FPGAs on a single card have been interconnected using IEEE 1149 (Joint Test Action Group—"JTAG") serial interconnections for configuration purposes. However, such JTAG serial interconnections are not suitable for functions such as high-speed data transfer or signal processing. Thus, the use of multiple large FPGAs, embedded processors, and various standard interfaces on a single card present significant problems with card layout/routing and inter-card communication.

In large systems, FPGA and other high-performance computing devices are often buried in many layers of custom I/O connections, making them difficult to access for general use. This characteristic comprises many of the benefits realized from using a reconfigurable circuit.

Medical imaging applications such as Magnetic Resonance Imaging (MRI) and Positron Emission Tomography (PET) are by nature massively parallel calculation-intensive processes. Modern versions of these imaging technologies make extensive use of sophisticated digital signal processing (DSP) algorithms and matrix arithmetic to perform such functions as 3-D reconstruction, color coding, and real-time video display. Seismic oil exploration technology involves not only geology, but also the collection and processing of large amounts of data from geophone and hydrophone arrays. The analysis and multi-dimensional reconstruction of data from such arrays is a parallel problem which involves sophisticated matrix arithmetic as well as DSP.

Pharmaceutical and biotech-related applications such as drug interaction modeling and protein folding simulations are at the same time numerous and by nature extremely calculation-intensive. In one example, a simulation which works out the folding sequence for just 50 amino acid molecules (a very limited set compared to the chains which form real proteins) took 4 to 5 days to run. The computational problems with such calculations are so daunting that some researchers have even turned to volunteer computer networks to get more run-time on these simulations. One such group (the "folding@home" project from Stanford), runs protein folding and aggregation simulations by using the internet to access screen saver programs on volunteer PCs which each run a small piece of the overall parallel calculation.

Special effects in motion pictures and television are also very calculation intensive. Sophisticated effects such as shading, shadowing, texturing, as well as full character animation are becoming increasingly commonplace. One recent movie contained over 6,000 independent artificial intelligence (AI)-driven characters fighting in a lengthy battle sequence. Digital synthesis of a large number of such frames is very costly and time consuming. Because of the long times required to produce the final rendered product, wireframes and other shortcut methods are often used to facilitate the shooting process. As a result, intricate planning and post production is required to make sure that the final effects will fit together with the related live action.

SUMMARY OF THE INVENTION

Disclosed are methods and systems for interconnecting Application Specific Integrated Circuit ("ASIC") devices using simplex and/or duplex serial I/O connections, including high speed serial connections such as multi-gigabit serial transceiver ("MGT") connections. Examples of ASIC devices that may be interconnected using the disclosed systems and methods include, but are not limited to, Field Programmable Gate Arrays ("FPGAs") or other field programmable devices ("FPDs") or programmable logic devices ("PLDs"). In one embodiment of the practice of the disclosed systems and methods, serial I/O connections may be employed to interconnect a pair of ASICs to create a low signal count connection. For example, in one exemplary embodiment, high speed serial I/O connections (e.g., such as MGT connections) may be employed to interconnect a pair of ASICs to create a high bandwidth, low signal count connection.

In one embodiment of the disclosed systems and methods, any given pair of multiple ASIC devices on a single circuit card (e.g., selected from three or more ASIC devices present as a ASIC array on a single circuit card) may be interconnected by one or more serial data communication links (simplex and/or duplex serial data communication links formed between respective serial I/O connections of a given pair of ASIC devices) so that the given pair of ASIC devices may communicate with each other through the two serial I/O connections of each of the serial data communication links with no other serial connection intervening in between, or in other words, in a "one-step" fashion. Such a capability may be implemented, for example, such that each embedded processor, processor node, card level-interface, user-defined hardware module, etc. is provided with access to each of the other such entities on the card through one or more separate respective "one step" data communication links that each includes no more than two respective serial connections coupled together (e.g., no more than two respective high speed serial connections coupled together) in the data communication path and through a minimum number of packet transfer points. In a further embodiment, such a respective data communication link may be further characterized as a "direct serial interconnection" between two such entities, meaning that no multi-port switch device (e.g., crossbar switch, etc.) exists in the serial data communication path between the boundaries of the two entities. Advantageously, the disclosed systems and methods may be so implemented in one embodiment to achieve communication between given pairs of devices with relatively high data transfer bandwidths and minimal wiring. Furthermore, the disclosed systems and methods may be utilized (e.g., extended) to establish a communications infrastructure across multiple circuit cards.

The disclosed systems and methods may be implemented in a variety of environments including, but not limited to, signal processing applications, communication applications, interfacing applications, networking applications, cognitive computing applications, test and measurement applications, etc. For example, the disclosed systems and methods may be implemented as part of a reconfigurable hardware architecture ("RHA"), such as a reconfigurable signal processing circuit, that serves as a consistent framework in which ASIC applications may be user-defined and/or deployed in such a way as to enhance code portability, design re-use, and inter-communication, as well as to support board-level simulations extending beyond and between individual ASIC boundaries.

In one embodiment, a RHA may be configured to include a packet-based communications infrastructure that uses a high-bandwidth switch fabric (e.g., crossbar, etc.) packet router to establish standard communications protocols between multiple interfaces and/or multiple devices that may be present on a single circuit card (e.g., interfaces, processor nodes, and user-defined functions found on signal processing cards). Such a RHA may be further configured in one embodiment to provide a useful communications framework that promotes commonality across multiple (e.g., all) signal processing applications without restricting user utility. For example, packets conforming to a given interface (e.g., Race++ standard) may be processed by stripping the packet header off and then routing the remaining packet between ASIC devices using the standardized packet router infrastructure of the disclosed methods and systems. Advantageously, such a RHA may be implemented in a manner that does not preclude the addition of high-performance user connectivity, e.g., by only using a relatively small fraction of the available serial I/O connections (e.g., MGT connections) and ASIC (e.g., FPGA) gate resources. In one specific embodiment, embedded serial I/O connections (e.g., embedded MGT connections) of multiple FPGA devices may be used to interconnect the FPGA devices in a manner that advantageously reduces on-card I/O counts and the need for large numbers of termination components. However, it will be understood that non-embedded serial I/O connections may also be employed in the practice of the disclosed systems and methods.

In the practice of one exemplary embodiment of the disclosed systems and methods, multiple FPGAs of a FPGA array may be coupled together on a single card to communicate at the card-level basis using packet routing through one or more switch fabrics, e.g., crossbar switches, etc. In such an embodiment, each given pair of FPGA devices of a FPGA array may be linked in a manner that advantageously minimizes packet transfer latency times in the switch fabric, while at the same time allowing every source to have access to every destination in the array. In such an embodiment, a universal bridging method may be used in each FPGA to allow inter-communication between any two processors/interfaces on a single circuit card. In one exemplary embodiment, the bridging method may be implemented with a First-In First-Out ("FIFO") packet relay protocol that may be readily integrated into or mapped onto the slave functionality of standard interfaces and/or processor buses.

Thus, the disclosed systems and methods may be implemented using a predictable and uniform or standardized interface across the boundaries between each pair of board-level components (e.g., FPGAs, ASICs, general-purpose processors, etc.) to help promote consistent communications, board-level testability, design portability/re-use, and to provide a user with a relatively high degree of flexibility in establishing functional partitions for hardware modules mapped into an ASIC (e.g., FPGA) array. Further, built-in support for packet integrity checking and automatic retransmission of bad packets may be provided to facilitate the usage of the inter-ASIC links with hardware modules (e.g., signal processors such as Software-Defined Radios (SDRs), signal processing algorithms such as Fast-Fourier Transforms (FFTs) and wavelet transforms, data stream encryption and decryption, packet routing, etc.) that are sensitive to data corruption. For example, packet integrity checking (e.g., checksum, CRC, etc.) may be incorporated into the hardware layer (e.g., physical layer 1 of Open System Interconnection "OSI" protocol), for example, so that data may be transferred between hardware devices using a packet integrity checking method that is handled automatically by the hardware without the need for an upper layer of software to perform the packet integrity checking. For example, packet integrity protocol tasks (e.g., such as packet acknowledge, timeout, and retransmit tasks) may be built into interface/interconnection hardware present in a data communication link between ASICs or other devices. Using the configuration of the above-described embodiment, a ASIC array may be configured so as to be easily scaleable to other cards, e.g., permitting expansion of ASIC resources. Where described herein in relation to a FPGA array, it will be understood that the disclosed systems and methods may be implemented with an array of any other type of ASIC device or an array of a combination of types such devices.

As disclosed herein, reconfigurable communications infrastructures may be implemented to interconnect ASIC devices (e.g., FPGAs) and other computing and input/output devices using high bandwidth interconnection mediums. The disclosed reconfigurable communications infrastructures may be implemented in one embodiment to address communications infrastructure issues associated with interconnecting multiple computing devices such as ASICs. In this regard, the disclosed reconfigurable communications infrastructures may be implemented not only to interconnect ASIC devices that are provided on a single circuit card or that are provided within a single electronics chassis (e.g., provided on separate circuit cards within the same electronics chassis), but also to interconnect ASIC devices and other computing and input/output devices that are positioned in locations that are physically segregated from each other (e.g., that are positioned in different electronics chassis, positioned in different rooms of a given building or facility such as a military base, stationary oil and gas platform, shopping mall, or office building, positioned in different compartments of a given mobile vehicle such as an aircraft, truck and/or trailer, spacecraft, submarine, train, boat, mobile oil and gas platform, etc., and/or that are positioned at different locations using ports across a wide-area network such as the Internet, wireless networks, public telephone system, cable television network, satellite communications system, etc.).

Examples of computing and input/output devices that may be interconnected using the disclosed systems and methods while positioned in locations that are physically segregated from each other include, but are not limited to, analog/digital converters, digital/analog converters, RF receivers and distribution systems, sensor interfaces and arrays of such devices (e.g., such as antennas, microphones, geophones, hydrophones, magnetic sensors, RFIDs, etc.). Other examples of such devices include, but are not limited to, wired network interfaces (e.g., such as Ethernet, Gigabit Ethernet, Universal Serial Bus (USB), Firewire, Infiniband, Serial and Parallel RapidIO, PCIe, Fibre Channel, optical interfaces etc.), the Internet, wireless network interfaces (e.g., such as 802.11a, 802.11b, 802.11g, 802.11n, Multiple Input/Multiple Output (MIMO), Ultra-Wideband (UWB), etc.), bus interfaces (e.g., such as VME, PCI, ISA, Multibus, etc.), compute nodes (including both single and multiple sequential and parallel CPUs), human interface devices (e.g., video displays, manual entry devices, PDAs, cell phones, Personal Computers (PCs), etc.).

For example, in one embodiment of the disclosed systems and methods, a reconfigurable communications infrastructure may be provided to project a reconfigurable network across a wide area. Such a reconfigurable communications infrastructure may be provided, for example, to interconnect physically segregated ASIC devices (e.g., FPGA devices) and other computing devices in a standard and reconfigurable manner. Such an embodiment may be implemented to allow such computing devices to be used in a variety of different arrangements and applications, e.g., for use in any application where a large array of ASIC devices may be usefully employed such as supercomputing, etc. To enable interconnection of physically segregated ASIC devices and other computing devices that are physically segregated in relation to each other, high bandwidth interconnection mediums (e.g., such as optical networks and ultra wideband "UWB" wireless networks) may be employed to extend computing device interconnection across relatively large areas and, in one exemplary embodiment to couple together a reconfigurable communications infrastructure with reconfigurable circuits on a large scale.

In one exemplary embodiment, the disclosed reconfigurable communications infrastructures may be advantageously implemented to enable the creation of large parallel computing engines in places where they are not currently practical (e.g., such as in aircraft, ship, spacecraft, human-carried and other remote systems). In another exemplary embodiment, ASIC device (e.g., FPGA) "farms" may be created to offer processing services to a wider network. When implemented with a high bandwidth interconnection medium (e.g., an optical interconnect), such interconnected ASIC devices may be physically segregated and widely physically separated to allow ASIC and computing resources of a wide area (e.g., positioned in physically segregated locations within a large vehicle or a building) to be used independently or together, depending on system needs.

In the practice of the disclosed systems and methods, a reconfigurable network may be implemented using any interconnection medium and/or interface configuration that is suitable for providing high bandwidth communications between computing devices. Examples of suitable high bandwidth interconnection mediums include, but are not limited to, any interconnection mediums (e.g., optical, wired or wireless interconnection mediums) having a data transmission capability of greater than or equal to about 1 gigabit per second (Gbps). Suitable interface configurations that may be employed to implement the disclosed reconfigurable networks include, but are not limited to, a packet router interface switch matrix communications infrastructure as described further herein, or standard interfacing schemes such as Serial Rapid I/O.

The disclosed systems and methods maybe implemented for a variety of purposes and, in one embodiment, may be employed for distributed, clustered and/or parallel computing tasks. In one embodiment disclosed herein, gate-level reconfigurability may be coupled with a high connection bandwidth and a reconfigurable communications infrastructure to greatly increase the network performance envelope. The reconfigurable nature of the disclosed reconfigurable communications infrastructures may be implemented in one embodiment with a combination of gate-level reconfigurable computing devices (e.g., FPGAs) and high connection bandwidth capability via a high bandwidth interconnection medium to achieve increased performance. In one exemplary implementation, these features may be employed to enable the digital distribution of high bandwidth data in a manner that minimizes costly RF Distribution systems (RFDs) so that critical signal data is cleaner and more widely accessible.

In another exemplary implementation, superior performance may be provided in applications where many independent or loosely-coupled processes run in parallel or where a limited amount of hardware is required to perform many different functions. This capability may be employed, for example, in a manner that reduces waste from unused fixed application hardware while increasing processing thread capacity, and/or to allow hardware resources (e.g., computing devices) to be applied in an on-demand fashion, for example, on an as-needed basis to meet varying application requirements and/or to fit the requirements of one or more computing tasks that may exist at any given time. In yet another exemplary implementation, the disclosed reconfigurable communications infrastructures may be utilized to provide a background supercomputing capability, for example, to enable the ability to work certain classes of high-performance signal processing problems that otherwise cannot be worked using conventional computing technology. In this regard, non-active or otherwise-idle "background" processing assets (e.g., processors) may be combined and utilized to construct a background super-processor. Examples of applications in which such a capability may be advantageously implemented include, but are not limited to, applications where processing algorithms are not sample-rate limited, and/or where overhead from parallel processing requirements from working a given problem does not exceed the available calculation overhead. Particular examples of such applications include, but are not limited to, demodulation and analysis of spread-spectrum signals, direct sequence signals, digitally modulated signals, multi-dimensional beamforming, wideband beamforming, large-scale matched filters, low-probability of intercept (LPI) processing, cognitive and artificial intelligence algorithms, back-projection of 3-D images, medical imaging, seismic data processing, protein folding simulations, etc.

The disclosed systems and methods may be implemented in a manner to provide fast external interfaces, large internal interconnection bandwidth, and the ability to perform multiple parallel calculations simultaneously, and thus may be used in one embodiment to provide an advantageous processing environment for the matrix arithmetic calculations required by medical imaging algorithms, e.g., for parallel calculation-intensive processes such as MRI and PET and to provide 3-D reconstruction, color coding, and real-time video display. Additionally, the dynamic reconfiguration capability offered by the disclosed systems and methods may be used to minimize the size of an imaging processor, making the related equipment more manageable.

In another embodiment, the disclosed systems and methods may be implemented for collection and parallel processing of large amounts of data from geophone and hydrophone arrays (e.g., using matrix arithmetic) for multi-dimensional reconstruction of this collected data. In this regard, the disclosed systems methods may be so employed to achieve timely processing of collected seismic data in the field to reduce costs over conventional seismic processing methods, to improve collection accuracy, as well as to allow for same-day repositioning of sensors.

In another embodiment, the disclosed systems and methods may be implemented for computational purposes in pharmaceutical and biotech-related applications, such as drug interaction modeling and protein folding simulations. For example, individual reconfigurable ASIC-based processors may be custom-designed to perform these computation tasks (e.g., so that they each may be employed to run a small piece of an overall parallel pharmaceutical or biotech-related calculation), speeding up the process and making it more cost effective.

In yet another embodiment, the disclosed systems and methods may be implemented for special effects-related computational purposes, such as shading, shadowing, texturing, and full character animation of AI-driven characters. For such purposes, a large number of frames may be digitally synthesized in a manner more rapid that conventional methods, making "same-day" viewing of the final product possible and in doing so, enhancing creativity by providing a faster turnaround.

In one respect, disclosed herein is signal processing circuitry including three or more ASIC devices coupled together by one or more serial data communication links so that any given one of the three or more ASIC devices may communicate with any given other one of the three or more ASIC devices through at least one serial data communication link that includes no more than two serial connections.

In another respect, disclosed herein is a method of processing signals using three or more ASIC devices, the method including communicating signals from each of the three or more ASIC devices to each other one of the three or more ASIC devices through at least one data serial communication link that includes no more than two serial connections.

In another respect, disclosed herein is an ASIC array, including: three or more ASIC devices, each of the ASIC devices having at least a first serial connection and a second serial connection; wherein a first serial connection of a first one of the three or more ASIC devices is coupled to a first serial connection of a second one of the ASIC devices with no other serial connection therebetween to form a first serial data communication link; wherein a second serial connection of the first one of the three or more ASIC devices is coupled to a first serial connection of a third one of the three or more other ASIC devices with no other serial connection therebetween to form a second serial data communication link; and wherein a second serial connection of the second one of the three or more ASIC devices is coupled to a second serial connection of the third one of the three or more ASIC devices with no other serial connection therebetween to form a third serial data communication link.

In another respect, disclosed herein is signal processing circuitry including three or more ASIC devices, each one of the three or more ASIC devices including a packet router, the packet router of each one of the three or more ASIC devices being coupled to each respective packet router of the other three or more ASIC devices by a separate respective duplex data communication link so as to form a direct serial interconnection between each two of the three or more ASIC devices.

In another respect, disclosed herein is a method of routing data packets between three or more ASIC devices of an ASIC array that each include a first serial connection and a second serial connection, the method including: transferring at least one data packet across a first serial data communication link formed between a first serial connection of a first one of the three or more ASIC devices and a first serial connection of a second one of the three or more ASIC devices with no other serial connection therebetween; transferring at least one data packet across a second serial data communication link formed between a second serial connection of the first one of the three or more ASIC devices and a first serial connection of a third one of the three or more other ASIC devices with no other serial connection therebetween; and transferring at least one data packet across a third serial data communication link formed between a second serial connection of the second one of the three or more ASIC devices and a second serial connection of the third one of the three or more ASIC devices with no other serial connection therebetween.

In another respect, disclosed herein is a method of processing signals using signal processing circuitry including three or more ASIC devices, each one of the three or more ASIC devices including a packet router, and the method including transferring at least one data packet from each the packet router of each one of the three or more ASIC devices to each respective packet router of the other three or more ASIC devices by a separate respective duplex data communication link that forms a direct serial interconnection between each two of the three or more ASIC devices.

In another respect, disclosed herein is a method, including: providing two or more ASIC devices, each one of the two or more ASIC devices including a packet router; providing a high bandwidth interconnection medium coupled between the packet routers of each of the two or more ASIC devices to form a reconfigurable communications infrastructure; and communicating data between the packet routers of each of the two or more ASIC devices across the high bandwidth interconnection medium.

In another respect, disclosed herein is a reconfigurable communications infrastructure, including: two or more ASIC devices, each one of the two or more ASIC devices including a packet router; and a high bandwidth interconnection medium coupled between the packet routers of each of the two or more ASIC devices to provide data communication between the packet routers of each of the two or more ASIC devices.

In another respect, disclosed herein is a communications infrastructure, including two or more ASIC devices, each one of the two or more ASIC devices including a packet router, the packet router of each one of the two or more ASIC devices being coupled to each respective packet router of each of the other of the two or more ASIC devices by an interconnection including a high speed serial optical link.

In another respect, disclose herein is a method, including: providing two or more ASIC devices, each one of the two or more ASIC devices including a packet router coupled together by an interconnection including a high speed serial optical link, and transferring at least one data packet from each the packet router of each one of the two or more ASIC devices to each respective packet router of each of the other of the two or more ASIC devices by the high speed serial optical link.

BRIEF DESCRIPTION OF THE DRAWINGS

FIG. 6 illustrates a data packet header according to one exemplary embodiment of the disclosed systems and methods.

DESCRIPTION OF ILLUSTRATIVE EMBODIMENTS

Figure 1:
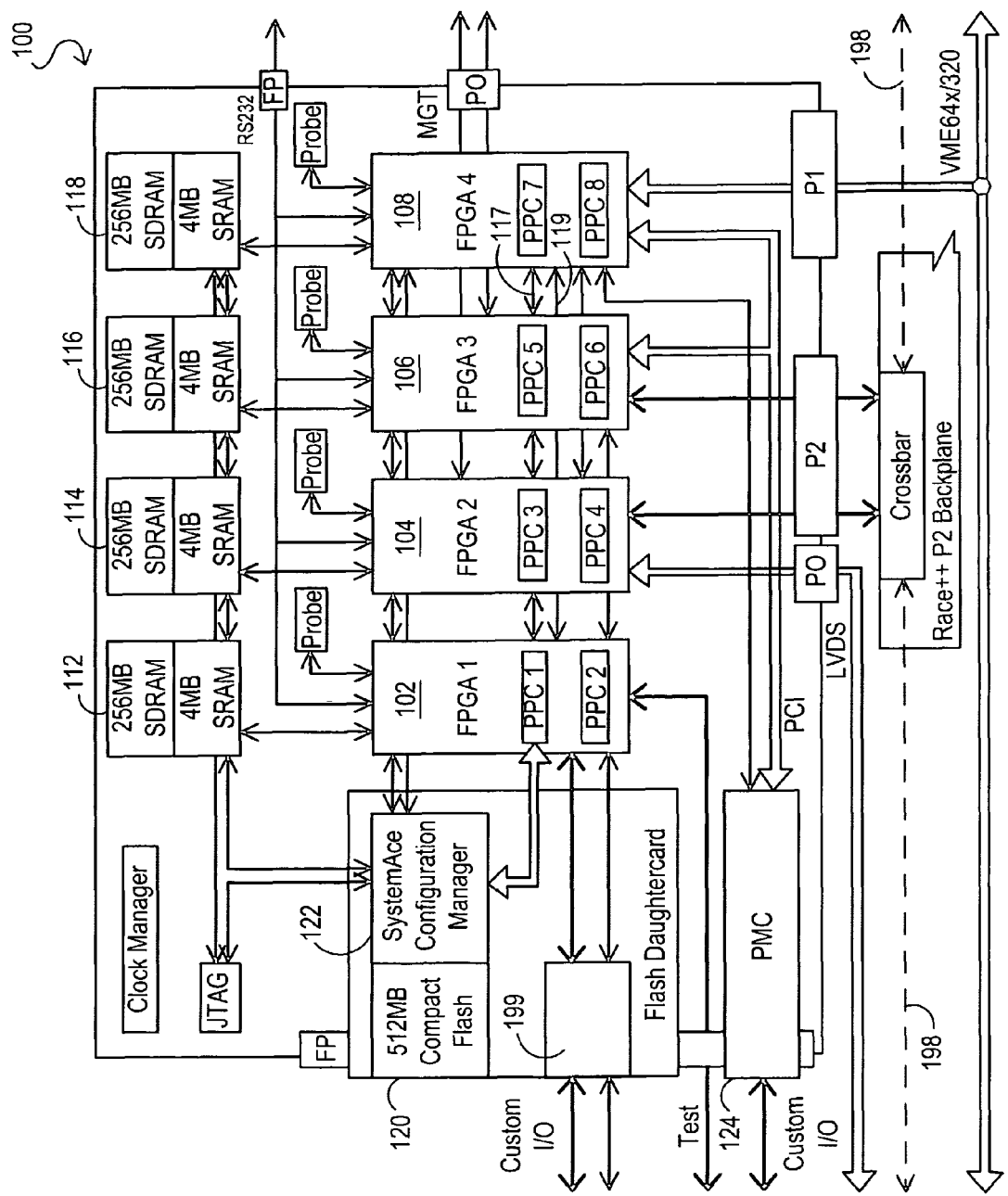
FIG. 1 illustrates a reconfigurable signal processing circuit according to one exemplary embodiment of the disclosed systems and methods.

FIG. 1 illustrates a reconfigurable signal processing circuit 100 as it may be configured on a single circuit card for reconfigurable signal processing and I/O applications according to one exemplary embodiment of the disclosed systems and methods. As shown in FIG. 1, multiple ASIC devices may be provided on a single circuit card, in this exemplary embodiment in the form of four FPGA devices 102, 104, 106 and 108. As will be described further herein, a packet router interface switch matrix ("PRISM") may be provided to route packets between FPGA devices 102, 104, 106 and 108, and other card-level and off-card devices and interfaces in a manner as will be described further herein. As illustrated in the figures herein, arrowhead notation is provided to indicate signal communication with a particular component. In this regard, an arrowhead that intersects a given device or component indicates signal communication to that given component in the direction indicated, while a line without an arrow head indicates that the line passes behind that component, i.e., without signal communication to the component. For example, in FIG. 1, duplex serial data communication link 117 is provided between FPGA devices 106 and 108, and duplex serial data communication link 119 is provided between FPGA devices 102 and 108.

In one exemplary embodiment, each of FPGA devices 102, 104, 106 and 108 may be a Xilinx Virtex-II Pro® XC2VP50 FPGA device (available from Xilinx, Inc. of San Jose, Calif.), and FPGA devices 102, 104, 106 and 108 may be interconnected via high speed serial I/O connections in the form of multiple MGTs that may be interconnected to form data communication links. In this regard, each XC2VP50 FPGA device features a massive programmable logic array, including over 50,000 flip-flops and their associated combinational logic. Additional embedded functions of Xilinx Virtex-II Pro® XC2VP50 FPGA devices include two PowerPC® ("PPC") 405 cores, 232 18×18 multipliers, 4.2 Mb of RAM, 852 user-defined I/O pins, 16 MGTs, and digital clock management.

When implemented with four Xilinx Virtex-II Pro® XC2VP50 FPGA devices, signal processing circuit 100 of FIG. 1 may be configured in one embodiment to accommodate board-level designs in the 15 to 20 million-gate range. However, although the signal processing circuit of FIG. 1 is described and illustrated with respect to one particular type of FPGA device, it will be understood that the disclosed systems and methods may be implemented with any other number and/or type/s of multiple ASIC devices that are suitable for card-level interconnection using serial I/O connections. Specific examples of other types of suitable ASIC devices include, but are not limited to, other Virtex-II Pro® devices, Altera Stratix GX® devices, other large FPGAs with high-speed serial I/O, custom ASIC devices with high-speed serial I/O, hardware modules using discrete high-speed serial I/O, etc. Further exemplary information on the use of MGT connections on PLD devices as may be employed in the practice of the disclosed systems and methods may be found in U.S. Pat. No. 6,617,877, which is incorporated herein by reference.

Still referring to FIG. 1, each FPGA device 102, 104, 106 and 108 may be configured to have access to respective dedicated memory resources 112, 114, 116 and 118 that may each include, for example, 256 MB of 266 MHz DDR SDRAM and 4 MB of 100 MHz ZBT SRAM. As illustrated, a Compact Flash ("CF") module 120 may be provided for use as non-volatile storage of FPGA configuration data and software. In this regard, a 512 MB CF device may be configured in one exemplary embodiment to store up to 45 configurations for the four-FPGA array of FIG. 1, and an automated reconfiguration manager 122 (e.g., Xilinx System Ace®) may be provided to support JTAG communications between the multiple FPGAs and full reconfiguration of the four-FPGA array, e.g., in under 5 seconds. In one exemplary embodiment, the illustrated signal processing circuit embodiment of FIG. 1 may be configured to offer a variety of standard interfaces, e.g., including VME64x, PCI, RACE++, parallel Rapid I/O, and high-speed serial standards based on MGTs. In this regard, MGT-based interfaces may include, for example, Fibrechannel, Serial Rapid I/O, XAUI (gigabit Ethernet), Infiniband, and Aurora. The exemplary signal processing circuit 100 of FIG. 1 may be provided with at least one PCI Mezzanine Card ("PMC") interface site 124 and/or other type/s of custom interface site/s (not shown) to interface with a wide variety of commercial off-the-shelf ("COTS") devices such as analog/digital converters ("A/Ds"), high-speed I/O, and auxiliary processors/memory (e.g., RAM).

Also illustrated in the exemplary embodiment of FIG. 1 are VME card connector plug jacks (P0, P1, P2), front panel ("FP") connections, RACE interlink 198, and optional parallel I/O paths that may be provided for connection to analyzer probes for test purposes. A custom front panel interface may be provided using any suitable I/O methodology (e.g., MGT serial connection/s, etc.). It will be understood that the foregoing components and features are exemplary only, and that any one or more of these components and/or features may be omitted, or that additional components and/or features may be present as so desired or needed to meet the requirements of a given application.

Figure 2:
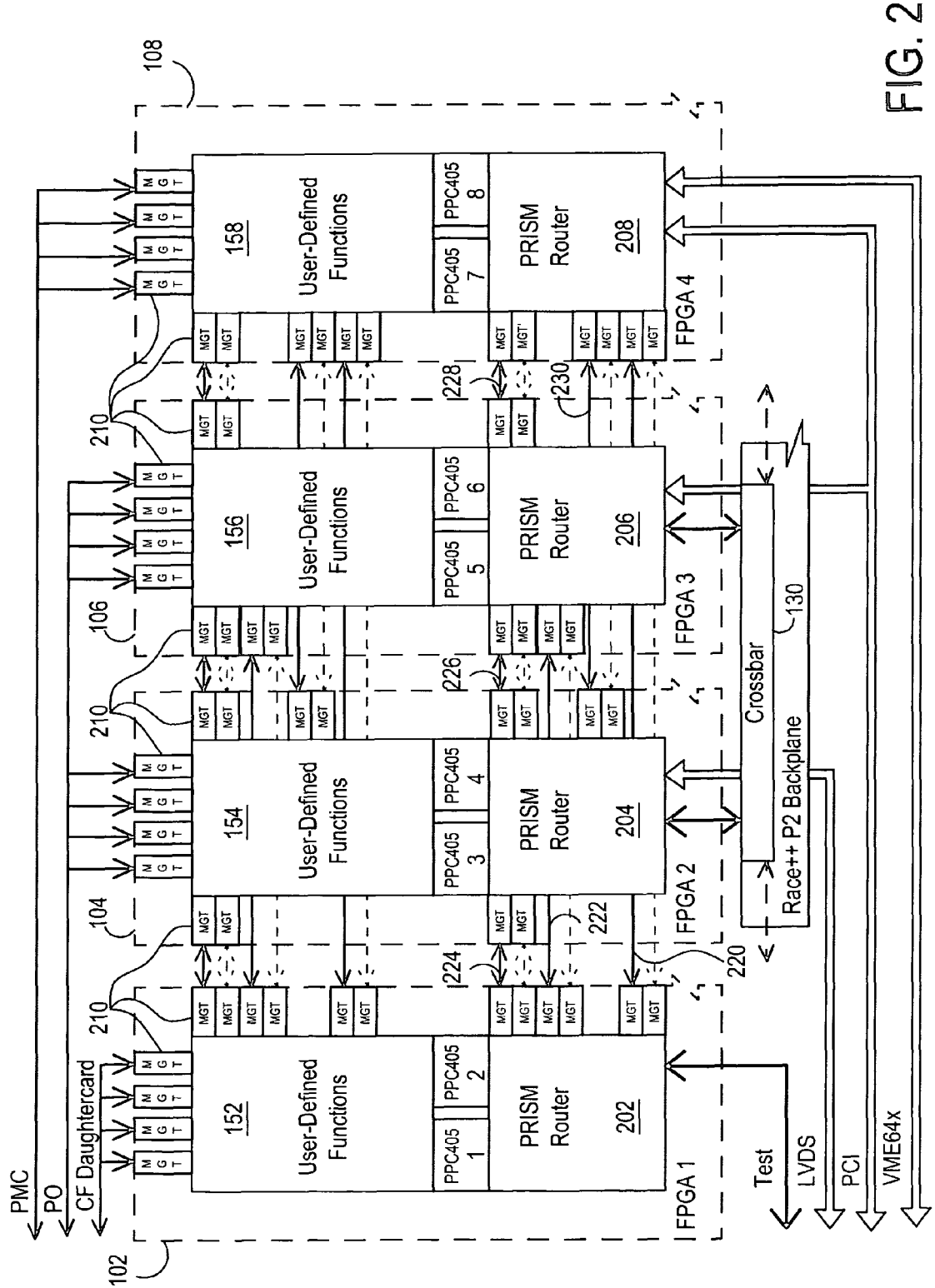
FIG. 2 illustrates a packet router interface switch matrix ("PRISM") communications infrastructure according to one exemplary embodiment of the disclosed systems and methods.

FIG. 2 illustrates one exemplary embodiment of a packet router interface switch matrix ("PRISM") communications infrastructure formed as a part of the RHA of reconfigurable signal processing circuitry 100 of FIG. 1, and as it may be implemented to interconnect multiple FPGAs 102, 104, 106 and 108 of the reconfigurable signal processing circuitry 100 of FIG. 1. As further illustrated in FIG. 2, in the PRISM infrastructure each FPGA 102, 104, 106 and 108 may be configured with a respective high-bandwidth crossbar router that operates at or near the data transfer bandwidth of the associated high speed interfaces (e.g., about 240 Mbytes/sec or faster). In this regard, each of crossbar routers 202, 204, 206 and 208 may be provided for intra-FPGA communications, and may be provided with MGT connection cores 210 for inter-FPGA communications and communications with other devices.

As implemented in the exemplary embodiment of FIG. 2, the PRISM infrastructure may be configured to interconnect many of (or all) card-level interfaces, processor nodes, and/or user functions related to circuitry 100. In this regard, the PRISM infrastructure may be implemented to provide a useful basic communications framework that promotes commonality across many (or all) applications with little or no restriction to user utility. Further, the PRISM infrastructure may be implemented in a manner that does not preclude the addition of high-performance user connectivity, as it may be implemented to only use a portion of the available MGT and FPGA gate resources.

Figure 3:
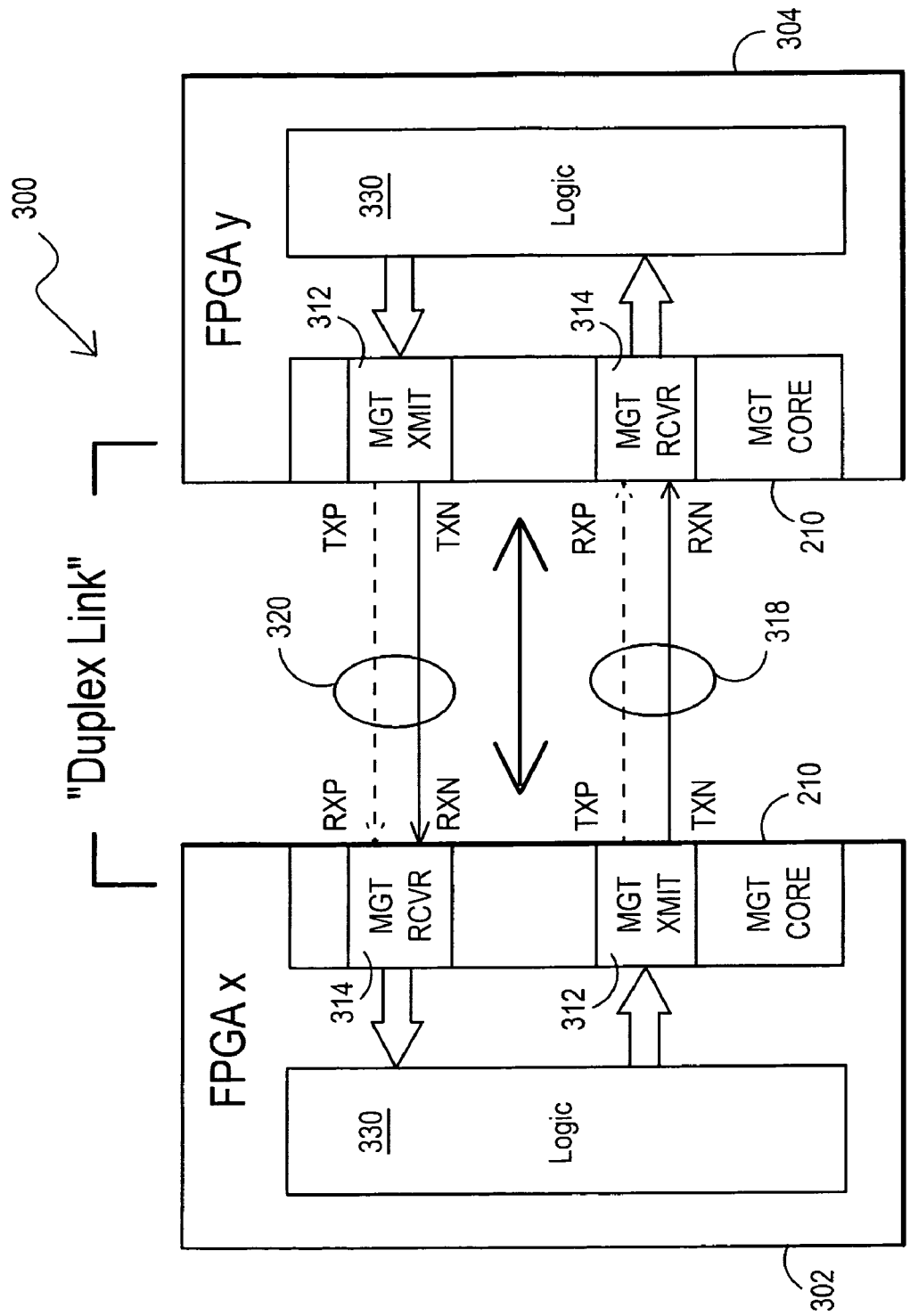
FIG. 3 illustrates a duplex data communication link according to one exemplary embodiment of the disclosed systems and methods.

Still referring to the exemplary embodiment of FIG. 2, a PRISM infrastructure may be implemented in the framework code of each FPGA 102, 104, 106 and 108 in a manner that interconnects many (or all) card-level interfaces, processors, and user-defined functions of signal processing circuitry 100 via MGTs 210 and high-bandwidth packet routers 202, 204, 206 and 208. In this regard, packets may be transferred between PRISM ports in point-to-point fashion, and PRISM hardware may be configured to handle all the details of transmission, including arbitration of packet transfers with the same destination. In this regard, FIG. 3 illustrates one exemplary embodiment of a duplex data communication link 300 formed between a given pair of FPGAs 302 and 304 to provide communication between FPGAs 302 and 304 in one embodiment of a PRISM infrastructure matrix. As illustrated, communication between FPGAs 302 and 304 may be accomplished between two full-duplex MGT connection cores 210 (each including respective MGT transmitter 312 and MGT receiver 314) that form duplex data communication link 300. As illustrated in FIG. 3, MGTs 210 may be coupled to logic circuit 330 of respective FPGAs 302 and 304, and may be configured in this embodiment such that communication between FPGAs 302 and 304 is in the form of differential serial signals 318 and 320. It will be understood that two ASIC devices may be interconnected by more than one duplex data communication link (e.g., using two or more pairs of MGT cores 210), and that non-duplex or any other suitable type of communication link/s may be employed in other embodiments to interconnect multiple ASIC devices.

As shown by the double-arrowhead lines in FIG. 2, a packet router interface switch matrix ("PRISM") communications infrastructure may be configured so that one or more direct duplex data communication links exists between any given two ASIC devices, and in this exemplary embodiment between any two FPGAs of multiple FPGAs 102, 104, 106 and 108. For example, duplex data communication link 220 is shown provided between one MGT 210 of PRISM router 202 of FPGA 102 and one MGT 210 of PRISM router 208 of FPGA 108; duplex data communication link 222 is shown provided between one MGT 210 of PRISM router 202 of FPGA 102 and one MGT 210 of PRISM router 206 of FPGA 106; duplex data communication link 224 is shown provided between one MGT 210 of PRISM router 202 of FPGA 102 and one MGT 210 of PRISM router 204 of FPGA 104; duplex data communication link 226 is shown provided between one MGT 210 of PRISM router 204 of FPGA 104 and one MGT 210 of PRISM router 206 of FPGA 106; duplex data communication link 228 is shown provided between one MGT 210 of PRISM router 206 of FPGA 106 and one MGT 210 of PRISM router 208 of FPGA 108; and duplex data communication link 230 is shown provided between one MGT 210 of PRISM router 204 of FPGA 104 and one MGT 210 of PRISM router 208 of FPGA 108. One or more additional duplex data communication links may be optionally provided between respective MGTs 210 of two or more (e.g., between all) of the multiple FPGAs 102, 104, 106 and 108, as shown by the additional dotted and solid double-arrowhead lines in FIG. 2.

As further shown in FIG. 2, FPGAs 102, 104, 106 and 108 may be provided with MGTs 210 that form at least one duplex serial link between the User-Defined Functions (152, 154, 156, 158) of each FPGA pair, as well as MGTs 210 that form at least one duplex serial link between the PRISM routers (202, 204, 206, 208) of each FPGA pair, although it will be understood that it is not necessary for a given application that duplex serial links be provided between FPGA User-Defined Functions of given pair/s of FPGAs. Rather, the disclosed systems and methods may be implemented in one alternative embodiment by providing as few as one serial link (e.g., duplex serial link) between pairs of FPGA PRISM routers. It is also possible that one or more data communication link/s (e.g., duplex data communication links) may be provided between FPGA User-Defined Functions of a given pair/s of FPGAs (but not between FPGA PRISM routers), while at the same time one or more duplex data communication link/s may be provided between FPGA PRISM routers (but not FPGA User-Defined Functions) of another given pair/s of FPGAs. Thus, it will be understood that in the practice of the disclosed systems and methods that any FPGA function or embedded module/device on a given FPGA (or other type ASIC) may be linked to any FPGA function or embedded module/device (of the same or different type) on another FPGA (or other ASIC) using one or more serial data communication link/s (e.g., high speed I/O serial data communication links).

Figure 4:
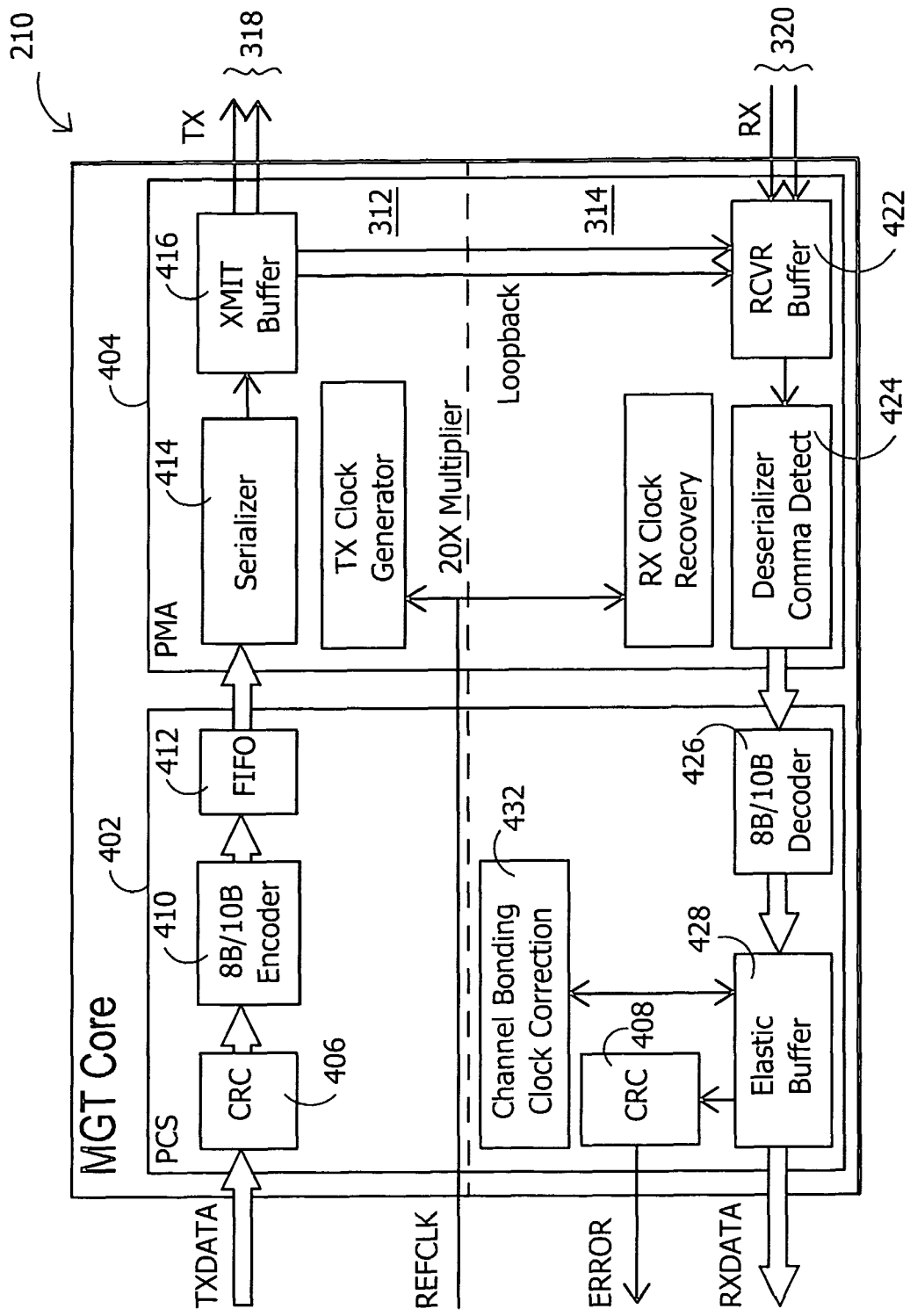
FIG. 4 illustrates a MGT connection core according to one exemplary embodiment of the disclosed systems and methods.

FIG. 4 illustrates a serial I/O connection core, in this illustrated exemplary embodiment a MGT connection core 210 (e.g., a Xilinx Virtex-II Pro® MGT connection core), as it may be employed in one exemplary embodiment of the disclosed systems and methods. As illustrated, a MGT connection core 210 may be configured to include transmitter circuitry 312 and receiver circuitry 314. Sixteen such MGT cores 210 are provided in each Xilinx Virtex-II Pro® XC2VP50 FPGA device employed in the illustrated embodiment, although it will be understood that other types of ASIC devices and/or ASIC devices having a different number of serial connections (e.g., MGT connections or other suitable type/s of serial connections) may be employed in the practice of other embodiments of the disclosed systems and methods.

As shown in the illustrated embodiment of FIG. 4, a Xilinx Virtex-II Pro® MGT core 210 may be employed that is configured with respective circuitry 402 and 404 to provide the Physical Coding Sublayer ("PCS") and Physical Media Attachment ("PMA") layers of the Open Systems Interconnection ("OSI") networking model. Such an exemplary MGT connection core 210 may support data transmission rates between 622 Mbps and 3.125 Gbps, and channel bonding between multiple transceivers may also be supported. Multiple clock inputs may be provided to allow for multi-rate operation, e.g., when requirements for low-jitter clocking preclude the use of programmable clocks.

Still referring to the exemplary Xilinx Virtex-II Pro® MGT core 210 of the embodiment of FIG. 4, a MGT transmitter 312 of core 210 may accept input word widths of 8, 16, or 32 bits. When a PRISM infrastructure is configured using such Xilinx MGT cores 210, the infrastructure may be configured in one embodiment so that MGT's 210 use a 32-bit input mode, although any other suitable input mode may be employed in other embodiments. In one exemplary embodiment, commas, clock correction sequences, and packet boundaries may be established via user-defined "K" characters, and a MGT transmitter 312 may include circuitry 406 to replace the last word of the packet with a Cyclical Redundancy Checking ("CRC") word that is used to verify packet integrity in circuitry 408 of MGT receiver 314. An 8B/10B encoder 410 may be used to translate input bytes into 10-bit words prior to serialization, e.g., ensuring no more than 5 consecutive ones or zeros in the resulting serial bit stream. A small FIFO 412 may be provided at the encoder output as an elastic buffer. As shown, MGT transmitter 312 may also be provided with serializer 414 and transmit buffer 416. The final bit stream may be sent as low voltage differential signal ("LVDS") 418, and impedance and pre-emphasis controls may be provided.

As illustrated, a MGT Receiver 314 may be configured with a receive buffer 422 to accept a LVDS bit stream 420, using an analog phase locked loop ("PLL") to recover the clock and data. A comma detect scheme may be employed to achieve byte alignment on the serial bit stream prior to deserialization in circuitry 424. An 8B/10B decoder 426 may be used to return the original byte values. Manipulation of pointers in an elastic buffer 428 may be used to support clock correction and channel bonding in circuitry 432. The embedded CRC word in each packet may be checked in circuitry 408 after an end-of-packet K-character ("EOP K-Character") is detected.

It will be understood with benefit this disclosure that FIG. 4 illustrates just one exemplary embodiment of serial I/O connection (i.e., a Xilinx Virtex-II Pro® MGT core) having particular signal handling features as described above that may be employed in a PRISM infrastructure of the disclosed systems and methods. In this regard, it will be understood that any other type of serial I/O connection or serial I/O connection (e.g., having fewer, different and/or additional signal handling features) that is suitable for serial digital signaling may be employed in other embodiments for implementing a PRISM infrastructure. Such serial digital signaling includes, but is not limited to, duplex serial digital signaling at byte transfer rates higher than the associated parallel interfaces. Examples of other suitable serial I/O connections include, but are not limited to, RS-232, AMD TAXI®, Hewlett-Packard G-Link, Fibrechannel FC-0, embedded microprocessor serial interfaces such as Texas Instruments' TMS320C30 serial links, various high-speed serial optical links, etc.

Figure 5:
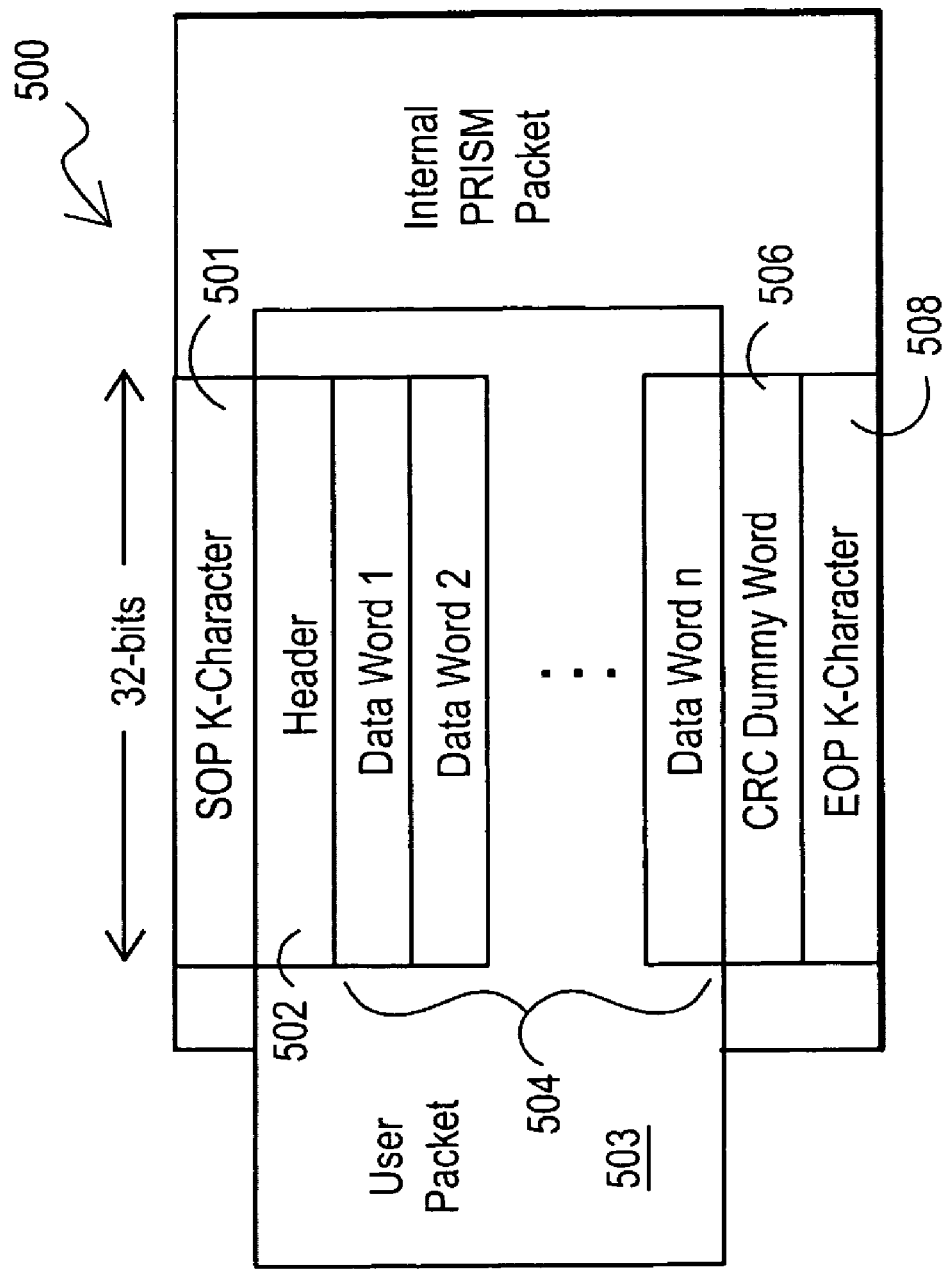
FIG. 5 illustrates a data packet according to one exemplary embodiment of the disclosed systems and methods.

FIG. 5 illustrates one exemplary embodiment of data packet 500 that may be employed for communication in a PRISM infrastructure. In such an embodiment, a PRISM router (e.g., 202, 204, 206, 208 of FIG. 2) may be configured to transfer data words from a source to a destination in the form of packets. As illustrated in FIG. 5, following the start-of-packet K-character ("SOP K-Character") 501 each PRISM packet may contain a user packet 503 that includes a header 502 and a data payload 504 organized into a series of 32-bit words. Also illustrated are CRC word 506 that may be present before the EOP K-Character 508 to verify packet integrity at the receiver in a manner as previously described. In one embodiment, PRISM packets 500 may range in length from 4 to 511 words.

FIG. 6 illustrates one exemplary embodiment of PRISM data packet header 600. As shown, packet header 600 may contain a routing code that allows the sender to determine the packet's destination within a PRISM infrastructure or matrix. In such an embodiment, packet wrappers, control characters, and associated packet retransmit protocols used in the inter-FPGA duplex data communication links 300 may be invisible to the user, and flow control protocols may be used to ensure that only one packet at a time is present in any of the point-to-point links.

It will be understood with benefit of this disclosure that FIGS. 5 and 6 illustrate just one exemplary embodiment of the PRISM packet and PRISM packet header that may be employed in the practice of the disclosed systems and methods. In this regard, examples of other suitable data packet configurations that may be employed in a PRISM infrastructure include, but are not limited to, TCP/IP, Fibrechannel, XAUI, Ethernet, Infiniband, Rapid I/O, etc.

Figure 7:
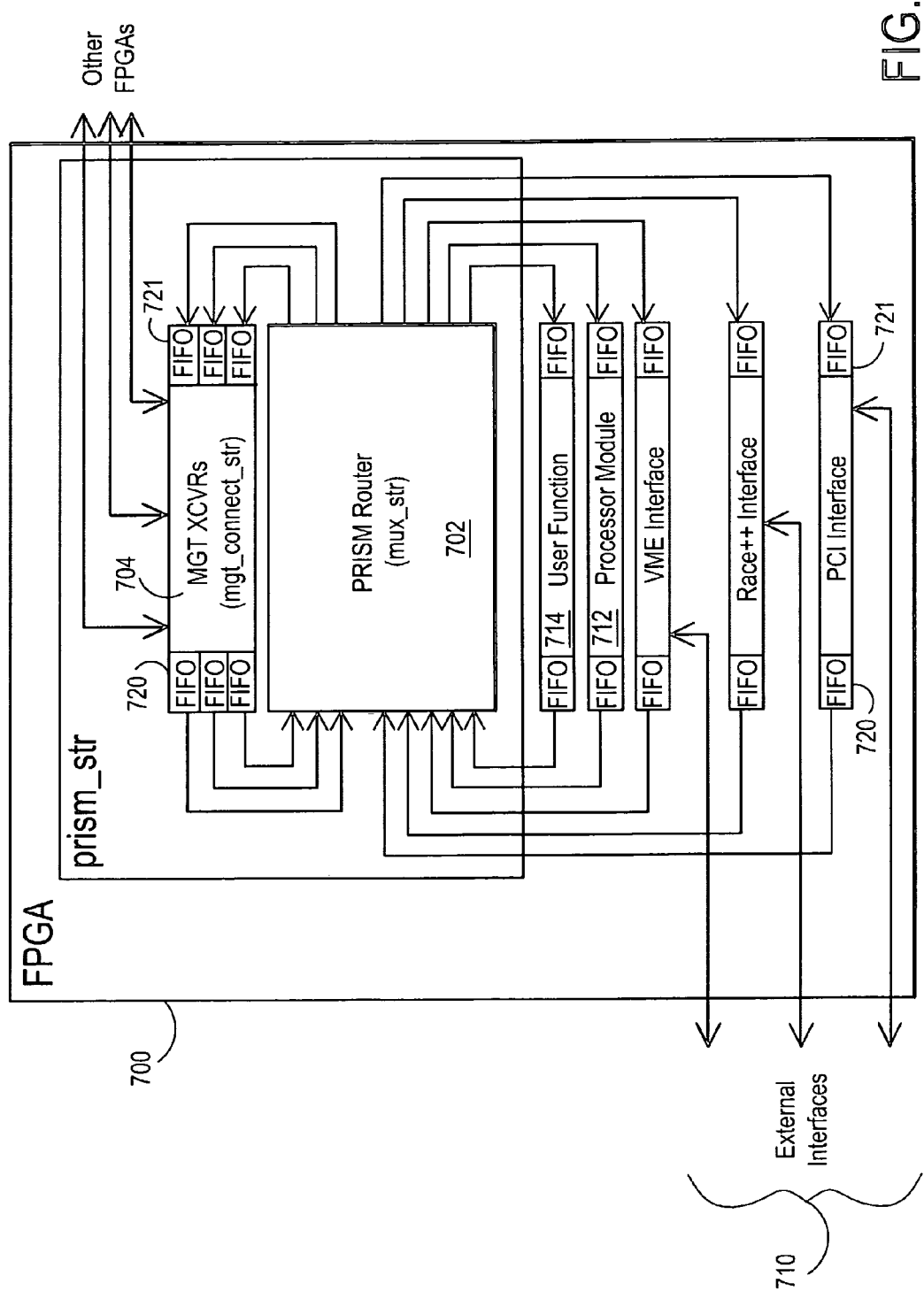
FIG. 7 illustrates a FPGA device that includes a PRISM router according to one exemplary embodiment of the disclosed systems and methods.
Figure 8:
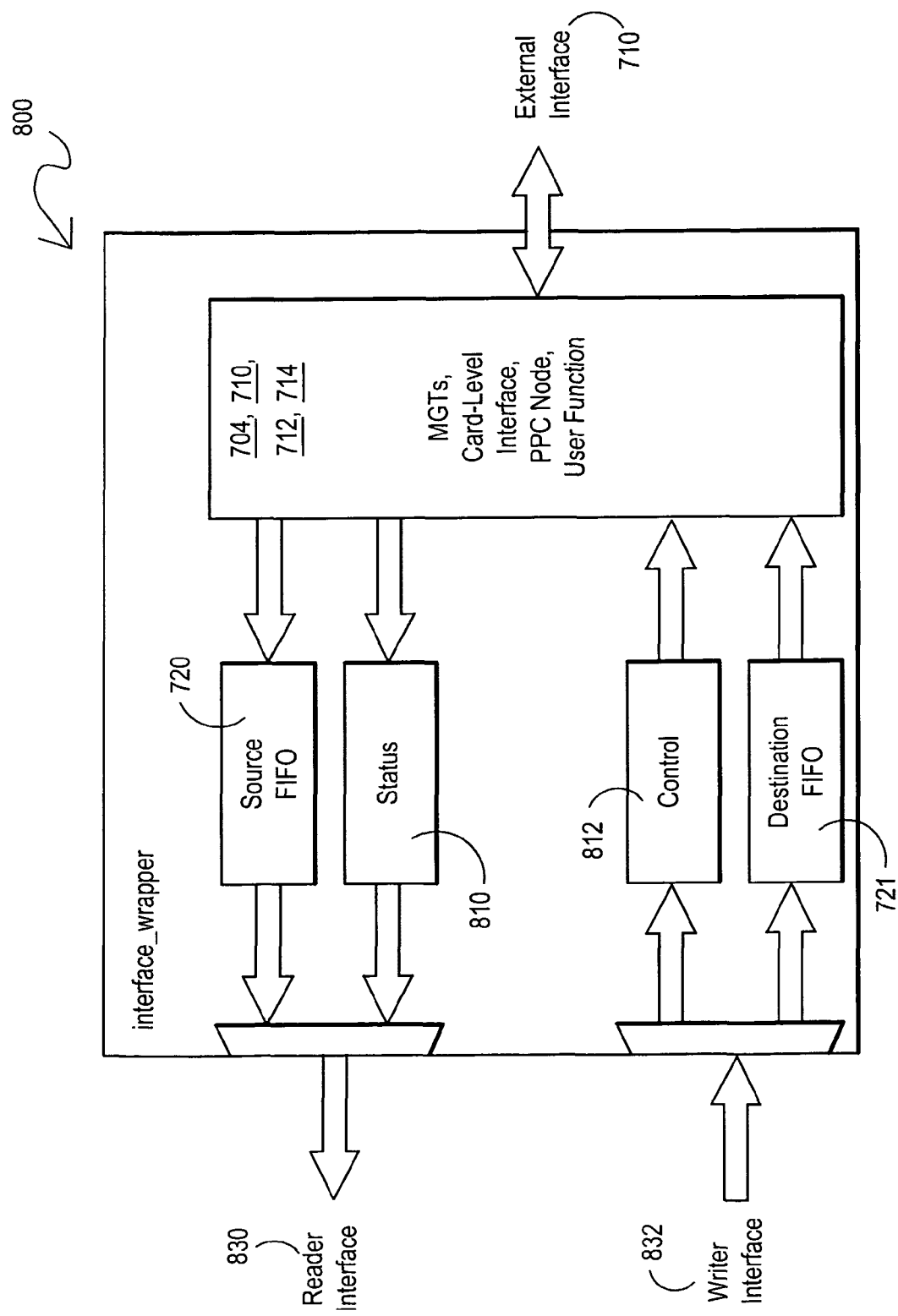
FIG. 8 illustrates a PRISM router interface wrapper according to one exemplary embodiment of the disclosed systems and methods.

FIG. 7 illustrates one exemplary embodiment of a PRISM router configuration 702 that may be used to transfer data packets within a PRISM infrastructure to interconnect multiple ASIC devices, e.g., to interconnect multiple FPGAs 102, 104, 106 and 108 of the reconfigurable signal processing circuitry 100 of FIG. 1. As shown in FIG. 7, each ASIC device (e.g., FPGA 700 of an FPGA array or other configuration of multiple ASIC devices) may be configured to include a PRISM router 702 that interconnects its card-level interface/s 710, processor/s 712, user function/s 714, and inter-FPGA MGTs 704. As shown for the exemplary embodiment of FIG. 7, PRISM router 702 may be configured to connect to MGTs 704, card-level interface/s 710, processor/s 712, and/or user-defined function/s 714 via source FIFO interfaces 720 and destination FIFO interfaces 721, and so that all PRISM interface ports share a similar structure as illustrated by PRISM router interface wrapper 800 of FIG. 8. In this regard, PRISM router 702 may be configured to see read and write interface ports 830 and 832 (e.g., router interface ports with MGTs 704, card-level interface/s 710, processor/s 712, user-defined function/s 714, etc.) as packet sources and destinations. In such an embodiment, interface modules may have source and destination FIFOs 720 and 721 mapped as slave functions, and users may read/write PRISM packets via these slave interfaces.

The disclosed systems and methods may be implemented using a PRISM communications infrastructure to distribute command/control packets in a manner that supports tasks such as reporting of status and command functions. For example, referring to the exemplary embodiment of FIG. 8, a datapath configuration scheme may be implemented via the PRISM matrix using status interface 810 and control interface 812. In this regard, control interface 812 may be provided to intercept control register packets (e.g., command packets provided by a user) that may be used for controlling PRISM matrix operations and/or user defined function operations. Similarly, status interface 810 may be provided to read status register packets transferred via the PRISM matrix. Advantageously, such a datapath configuration scheme may be implemented to achieve simplified operation and circuit layout, e.g., as compared to implementation of control and status tasks using host control register bus, or daisy chain topology.

In one embodiment of the disclosed systems and methods, a PRISM routing scheme may be configured so that each pair of FPGAs on a given circuit card share a duplex data communication link, and so that no matter what its source is, a packet will cross no more than one duplex data communication link to reach any destination in the PRISM matrix. In this regard, a packet may be routed from a given source to a given destination using any methodology suitable for reading packets from a given PRISM router input or "reader" interface (e.g., from a source FIFO attached to a PRISM router input interface as illustrated in FIG. 7), and for writing the packets to a given PRISM router output or "writer" interface (e.g., to a destination FIFO attached to a PRISM router output interface). Thus, in one embodiment, a "reader interface" may be characterized as an interface used to read packets from a FIFO attached to a PRISM router input, and a "writer interface" may be characterized as an interface used to write packets to a FIFO attached to a PRISM router output. However, it will be understood that any other type of packet transmission (e.g., packet queuing and/or arbitration) techniques other than FIFO may be employed that is suitable for reading packets from a PRISM router input and/or writing packets to a PRISM router output. Examples of such alternative techniques include, but are not limited to, Dual-Port RAM, microprocessor-controlled RAM buffers, register banks, etc.

It will be understood that a PRISM routing scheme may be optionally configured with additional routing capability. For example, when insufficient bandwidth is provided by all available direct duplex data communication links between two devices (e.g., between source and destination FPGA devices), additional bandwidth may be obtained by relaying all or a portion of packets through more than one duplex data communication link (e.g., by relaying packets from a source FPGA to a intermediate second FPGA and then to the destination FPGA through the PRISM router/s of one or more other FPGAs). When implemented, such routing decisions may be made manually by the user or automatically by the PRISM router.

Figure 9:
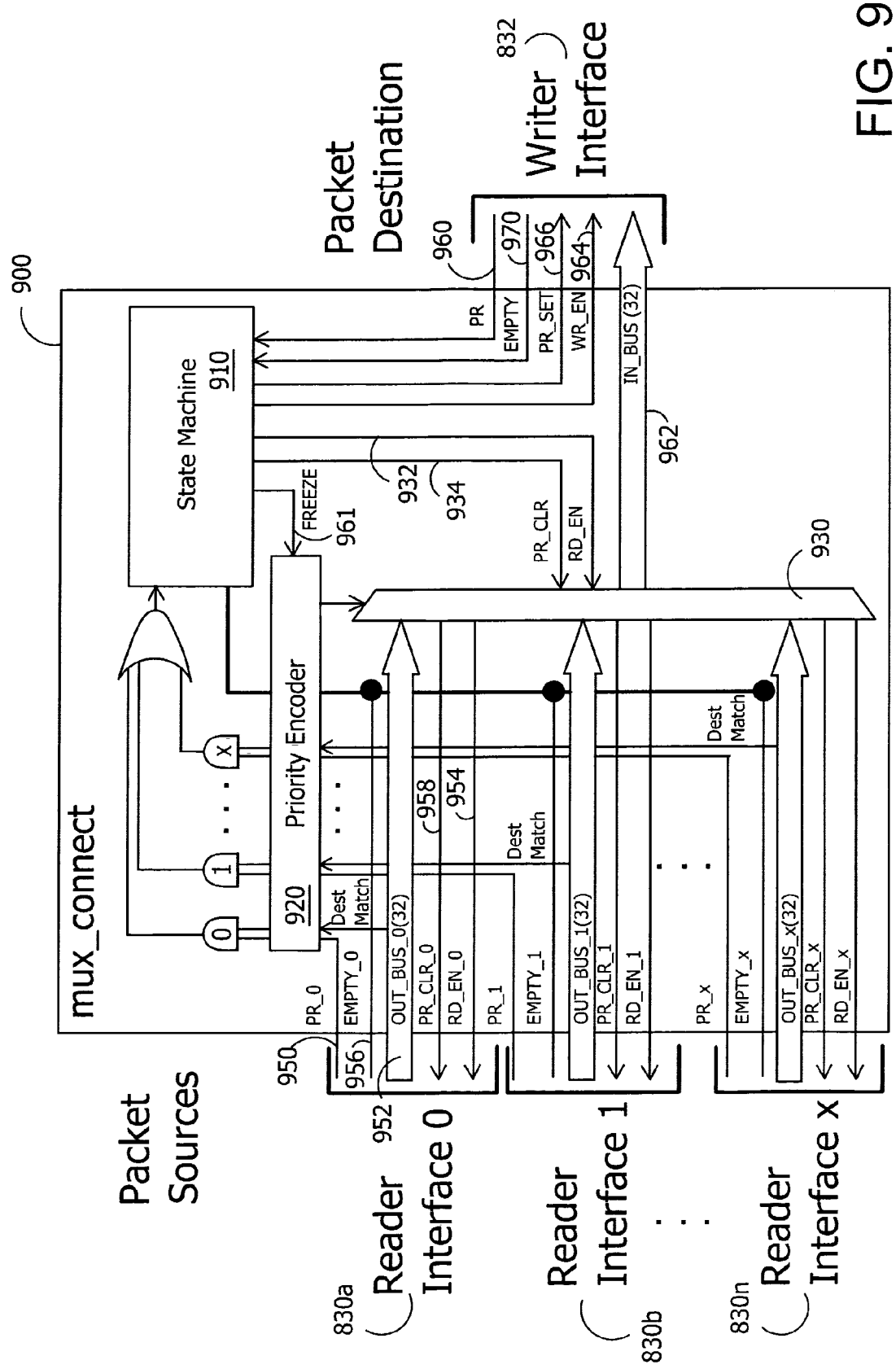
FIG. 9 illustrates a PRISM router connect multiplexer according to one exemplary embodiment of the disclosed systems and methods.

As illustrated in the exemplary embodiment of FIG. 9, each packet destination or writer interface 832 of PRISM router 702 may be configured with a connect multiplexer ("mux_connect") 900 that is capable of accessing each available PRISM reader interface 830a to 830n (e.g., each reader interface available in the local FPGA or other local ASIC device). Within a PRISM router 702 there may be multiple such packet destinations or writer interfaces 832 with a respective connect multiplexer 900 assigned to each corresponding packet destination. Using such an exemplary configuration, a packet transfer request may be asserted at a given reader interface 830 of the PRISM router 702 in combination with packet destination information that corresponds to the connect multiplexer 900 of the desired packet destination or writer interface 832.

As illustrated for the exemplary embodiment of FIG. 6, packet destination information may include, for example, both an FPGA destination code and a "local" destination code within the destination FPGA. In one example, the packet destination information may be written so that either the FPGA destination code matches the code for the current FPGA, or in the event that it does not, so that a specific MGT destination interface is provided. Thus, if the FPGA destination code does not match the code for the current FPGA, then one of the MGT interfaces will match an available MGT and the packet will be routed off the FPGA to the specified MGT destination. Packets so routed and received at an MGT interface are assumed to be at their destination FPGA and are then routed based on the local destination. However, if the FPGA destination code matches the code for the current FPGA, then the local destination code may be used to determine where the packet goes. It will be understood that such a packet routing scheme may be implemented with other types of ASIC devices besides FPGA devices, and that other types of packet routing schemes are also possible.

Still referring to the exemplary embodiment of FIG. 9, a packet read sequence may begin with a packet source FIFO 720 of a given reader interface 830a asserting a "packet ready" (PR_0) indication 950 to connect multiplexer 900 of a PRISM router 702. At this time, the header word of the packet, presented at DATA input (OUT_BUS_0) 952 of router 702, is assumed to be valid. Assertion of PR_0 indication 950 enables router 702 to transfer the packet as soon as the indicated packet destination (writer interface) 832 is available. The packet is read from the source FIFO 720 one word at a time by asserting the "read enable" control (RD_EN_0) 954. When the entire packet is read from the FIFO 720, the empty indicator (EMPTY_0) 956 is asserted. Assertion of "packet ready clear" (PR_CLR_0) 958 will cause PR_0 950 to be de-asserted to both the source FIFO 720 and to multiplexer 900 of a PRISM router 702. Router 702 will then wait until the next packet is available.

A packet write sequence may begin with an inactive "packet ready" (PR) indication 960 from a FIFO 721 of the specified packet destination (writer interface) 832. This serves as a signal to multiplexer 900 of a PRISM router 702 that FIFO 721 of the specified packet destination (writer interface) 832 is ready to accept the next packet. When a packet is available for this destination, multiplexer 900 of a PRISM router 702 writes it at DATA output (IN_BUS) 962 of router 702 to FIFO 721 of packet destination 832 one word at a time by asserting the "write enable" control (WR_EN) indicator 964. Once the packet is written into the FIFO 721 of the specified packet destination 832, assertion of "packet ready set" (PR_SET) 966 will cause PR 960 to be asserted from FIFO 721. PR 960 is de-asserted by FIFO 721 when it is ready to accept the next packet. Empty indicator (EMPTY) 970 may be asserted by FIFO 721 to indicate that the entire packet has been written to another device from the FIFO 721 of packet destination 832.

As further shown in FIG. 9, connect multiplexer 900 may be configured with an optional state machine 910 to process requests for transfer of packets based on a specified priority scheme (e.g., on a "first-come, first-served" basis). In one exemplary implementation using a "first-come, first-served" priority scheme, simultaneous transfer requests may be arbitrated by state machine 910 based on priority assigned by the priority encoder 920 (e.g., the higher the bit significance in the destination field, the higher the priority). State machine 910 may assert "read enable" control (RD_EN) 932 to demultiplexer 930 in order to read the packet from the selected reader interface 830a-830n. Assertion of "packet ready clear" (PR_CLR) 934 by state machine 910 will cause the packet transfer process to terminate. After the priority determination has been made by the priority encoder 920, state machine 910 may be configured to assert a selector control to the demultiplexer 930 and then lock it in place ("FREEZE" 961) in order to select a reader interface 830a-n for packet transfer. Once a transfer path has been selected, a bit in the packet header may be used to "lock" the point-to-point path, preventing any other source from using the destination. It will be understood that the foregoing priority scheme is exemplary only, and that any other priority scheme (or combination of priority schemes) may be employed that is suitable for processing multiple simultaneous requests for transfer of data packets based on one or more inherent and/or assigned criteria.

Figure 10:
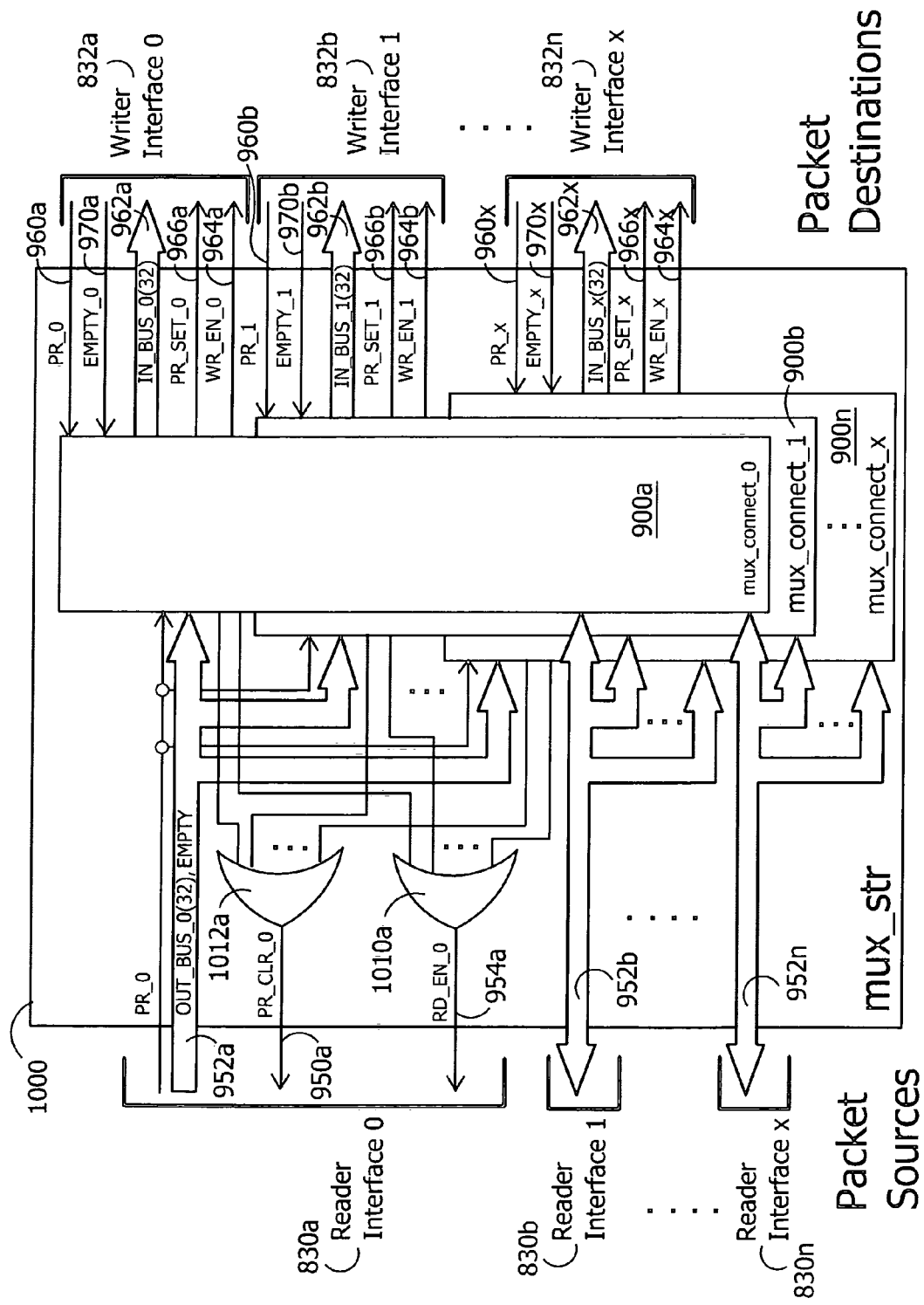
FIG. 10 illustrates a PRISM router matrix module according to one exemplary embodiment of the disclosed systems and methods.

FIG. 10 illustrates one exemplary embodiment of a PRISM router matrix module (mux_str) 1000 as may be implemented in the practice of the disclosed systems and methods. As shown in FIG. 10, an individual multiplexer connect module 900 (e.g., one of modules 900a to 900n) may be provided within matrix module 1000 for each individual PRISM writer interface 832a to 832n. As further illustrated, signals common to each reader interface 830a to 830n (e.g., such as RD_EN and PR_CLR signals) may be collected from each multiplexer connect module 900a to 900n and combined within matrix module 1000 (e.g., by signal combiners 1010 and 1012) for each PRISM reader interface 830a to 830n (only signal combiners 1010a and 1012a of PRISM reader interface 830a being illustrated in FIG. 10). To help assure portability, the same header word bit assignments may always be used for the same functions, regardless of which FPGA the router is instantiated into. In one embodiment, no one given FPGA uses all of the assigned bits at once and there is one pre-defined user, or "hardware" port. Thus, if more than one user port is required or desired for some reason, bits corresponding to an unused function in the given FPGA may be used for this purpose.

It will be understood that the embodiments illustrated herein are exemplary only, and that other configurations having fewer features, or having one or more alternative and/or additional optional features may be implemented in the practiced of the disclosed systems and methods. Examples of such optional features include, but are not limited to, multiple-destination broadcasts (e.g., implemented by either setting multiple destination bits in a packet header or by sending special command packets to create a "bucket-brigade" pathway within the PRISM matrix), multiple-FPGA relay modes (e.g., implemented by the use of multiple embedded headers and the header relay bit), and/or extension of an FPGA array to include two or more multiple circuit cards (e.g., implemented by the addition of additional MGT destination codes in the header which correspond to off-card MGT interfaces). Furthermore, in one exemplary embodiment, destination bits may be included in the routing field to support a "bypass" mode in the router that serves to facilitate relay of packets around more direct pathways which may be in use or may be non-functional. Furthermore, in another exemplary embodiment, bits may be included in the routing field to support a "debug" mode in the router that serves to facilitate tracing the source of packets. Furthermore, in another exemplary embodiment, bits may be included in the routing field to support a "command" mode in the router that serves to identify packets which carry command, control, and status information.

Figure 11:
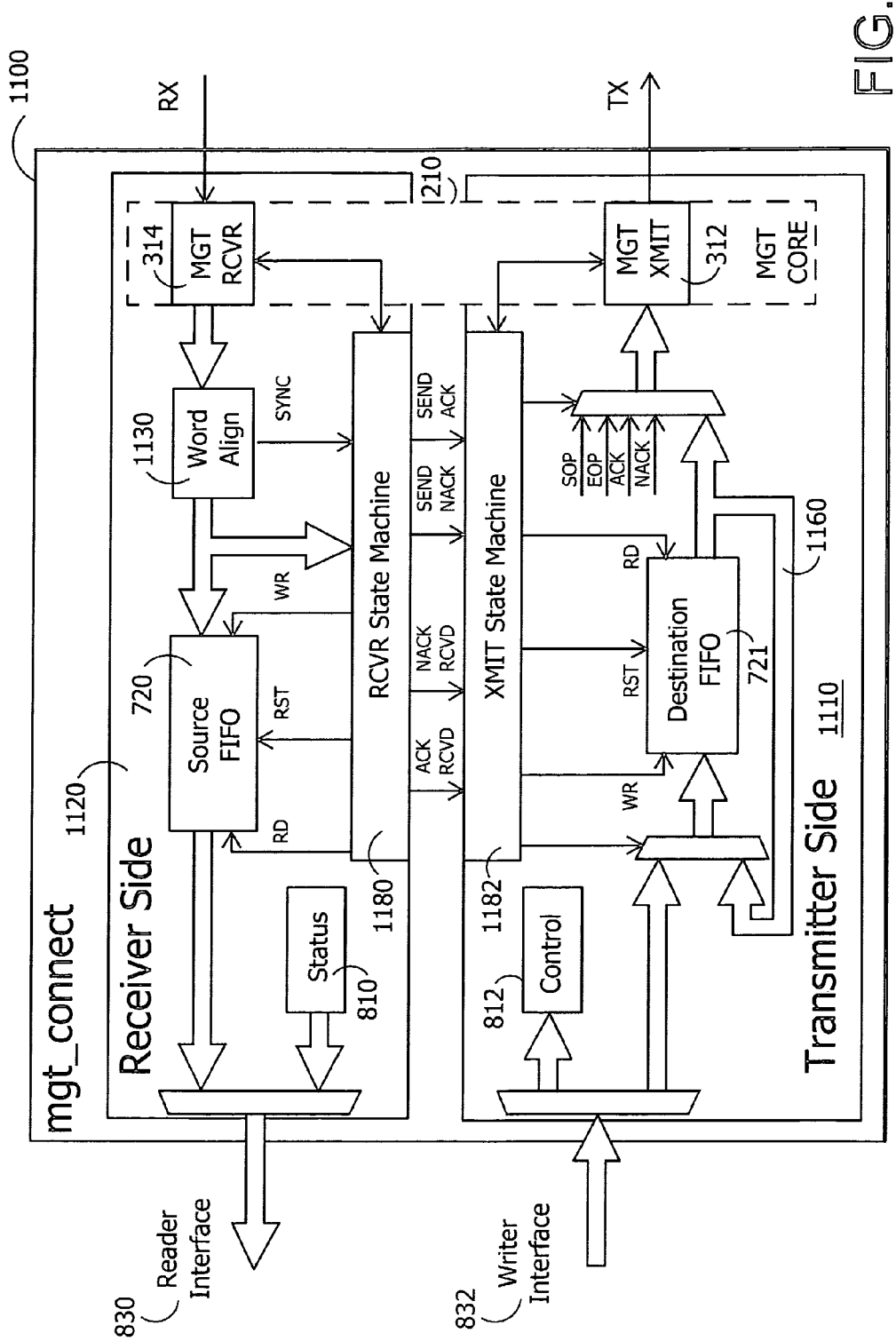
FIG. 11 illustrates a MGT connection module according to one exemplary embodiment of the disclosed systems and methods.

FIG. 11 illustrates one exemplary embodiment of a serial I/O connection module in the form of a MGT connection module (mgt_connect) 1100 as it may be implemented using a FPGA MGT core 1110 in the practice of the disclosed systems and methods. When desired, MGT connection module 1110 may be provided to handle occasional bit errors that may be seen in high-speed serial links by providing automatic flow control tasks, e.g., such as packet acknowledge, timeout, and retransmit tasks. MGT connection module 1110 may also be configured to monitor a MGT duplex data communication link between two communicating MGTs for problems such as those related to PLL, byte, and word synchronization.

As illustrated in FIG. 11, transmitter side circuitry 1110 of MGT connection module 1100 may provide a destination FIFO 721 coupled to a PRISM router writer interface 832 that provides for input of packet traffic from a PRISM router 702 to the destination FIFO 721. In such an exemplary embodiment, host configuration of module 1100 may be supported via special configuration packets. Other packets may be written to destination FIFO 721 (e.g., a 512×32 FIFO) and sent out via MGT transmitter 312 of MGT core 210 as the data payload of an internal packet format. Packet flow control may be maintained via acknowledge/not-acknowledge (ACK/NACK) protocol. As illustrated loop-back path 1160 may be provided so that FIFO 721 may write a packet back to its own input until receipt thereof is acknowledged and the packet is discarded. Thus, in case a packet needs to be retransmitted due to a bit error, a copy may be kept in FIFO 721 until the packet acknowledge is received.

Still referring to FIG. 11, receiver side circuitry 1120 of MGT connection module 1100 may provide a source FIFO 720 coupled to a PRISM router reader interface 830 that provides for output of packet traffic to a PRISM router 702 from source FIFO 720. In such an exemplary configuration, packets may be received by MGT receiver 314 and placed into source FIFO 720 (e.g., a 512×32 FIFO) to be accessed from PRISM router reader interface 830. As shown, word alignment multiplexer 1130 may be provided to manage operation (e.g., 32-bit operation) with MGT core 210. Generation of host status, error monitoring, and packet flow control functions may also be performed in word alignment multiplexer 1130. Also illustrated in FIG. 11 are receiver state machine 1180, transmit state machine 1182 and received (RCVD) and send (SEND) acknowledge (ACK) and not-acknowledge (NACK) signals, as well as write (WR), reset (RST), read (RD) and synchronization (SYNC) signals.

Figure 12:
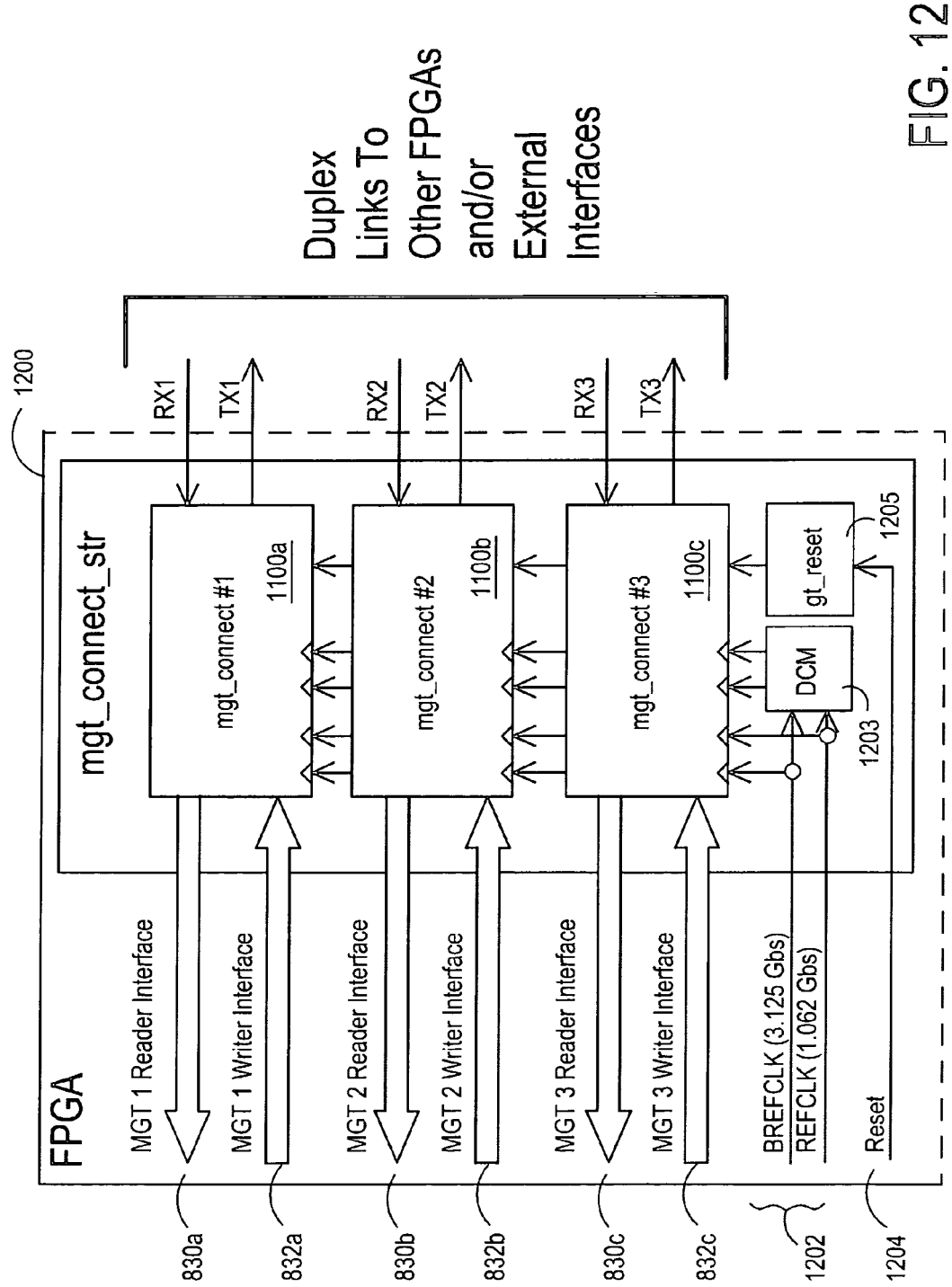
FIG. 12 illustrates a MGT connection wrapper according to one exemplary embodiment of the disclosed systems and methods.

In the practice of the disclosed systems and methods, two or more serial interface modules may be collected or otherwise assembled into one or more connection wrappers in order to consolidate/share common functions and/or tasks. For example, FIG. 12 illustrates one exemplary embodiment of a MGT connection wrapper (mgt_connect_str) 1200 that is configured with multiple MGT connection modules, in this case three MGT connection modules 1100a, 1100b and 1100c. It will be understood that MGT connection wrappers may be alternatively configured with two MGT connection modules or with more than three MGT connection modules in other embodiments. In the illustrated embodiment, the three multiple MGT connection modules 1100a-1100c are collected into common MGT connection wrapper 1200 in a manner so that they may share clock functions (1202, 1203)

and reset functions (1204, 1205). In this regard, FIG. 12 shows digital clock manager (DCM) 1203 and serial connection (MGT) reset 1205.

It will be understood that the particular PRISM router configuration described herein in relation to FIGS. 9 and 10 is exemplary only, and that any other packer router configuration suitable for transferring data packets within a PRISM infrastructure may be employed in the practice of the disclosed systems and methods. For example, a TCP/IP routing scheme may be implemented by configuring PRISM routers 702 as TCP/IP routers, and by assigning respective TCP/IP addresses to each source and destination device (e.g., each ASIC device such as FPGA) within the PRISM infrastructure.

Figure 13:
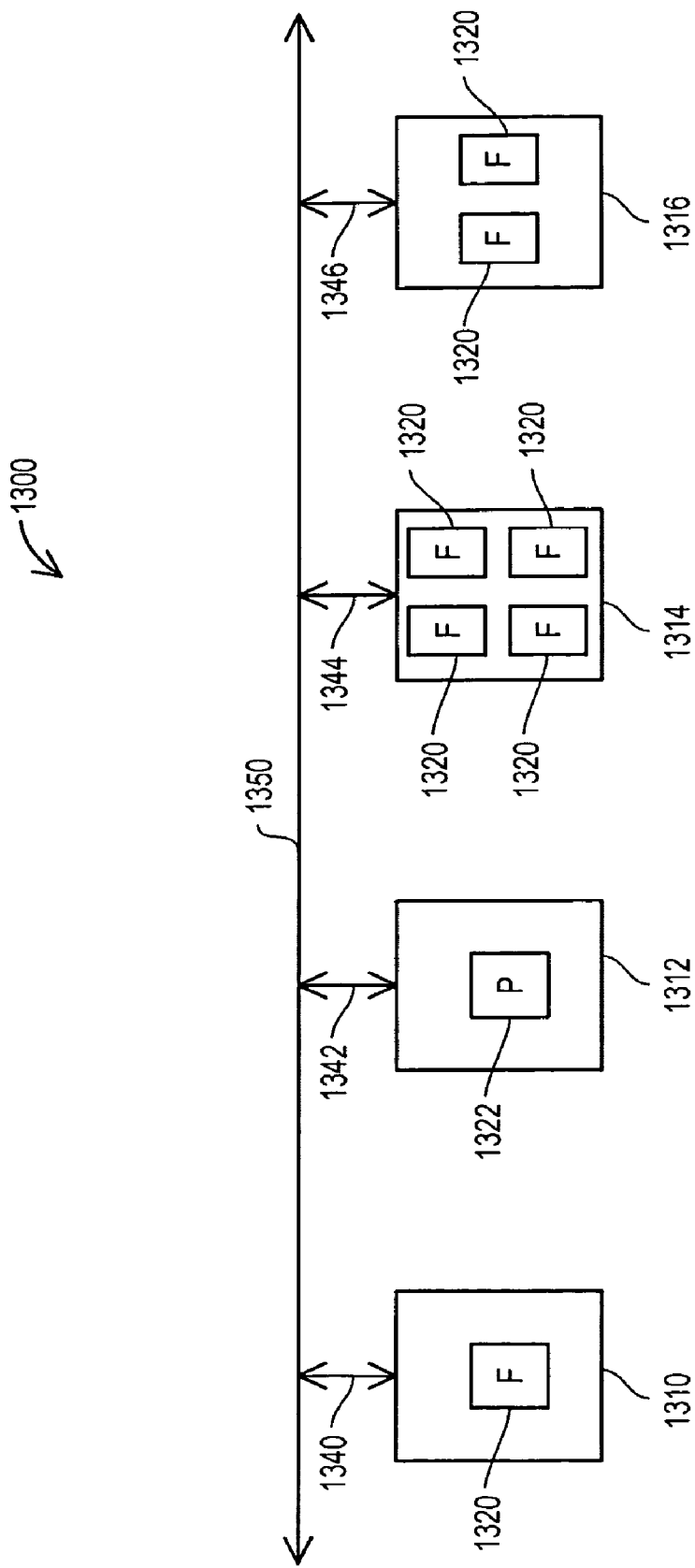
FIG. 13 illustrates a reconfigurable communications infrastructure according to one exemplary embodiment of the disclosed systems and methods.

FIG. 13 shows a reconfigurable communications infrastructure 1300 according to one exemplary embodiment of the disclosed systems and methods. In the embodiment of FIG. 13, reconfigurable communications infrastructure 1300 includes at least four separate signal processing circuits (e.g., four separate circuit cards) 1310, 1312, 1314 and 1316 that are interconnected by a high bandwidth interconnection medium 1350 to form a reconfigurable high bandwidth network. As shown in FIG. 13, each of signal processing circuits 1310, 1312, 1314 and 1316 includes at least one computing device and is interconnected to high bandwidth interconnection medium 1350 to enable high bandwidth bi-directional communications 1340, 1342, 1344 and 1346. In this exemplary embodiment, signal processing circuit 1310 includes a single ASIC device in the form of a FPGA 1320, signal processing circuit 1312 includes a single processor device (e.g., CPU, microprocessor), signal processing circuit 1314 includes an array of four ASIC devices in the form of four FPGAs 1320, and signal processing circuit 1316 includes an array of two ASIC devices in the form of two FPGAs 1320.

It will be understood that the illustrated embodiment of FIG. 13 is exemplary only, and that a reconfigurable communications infrastructure may be similarly implemented to interconnect two or more signal processing circuits (e.g. two or more signal processing circuits, three or more signal processing circuits, four or more signal processing circuits, five or more signal processing circuits, etc.) by a high bandwidth interconnection medium to form a high bandwidth network. Furthermore, each signal processing circuit may include one or more computing devices including, but not limited to, one or more ASIC (e.g., FPGA devices), one or more processor devices (e.g., one or more CPUs or microprocessors), embedded processing devices (e.g., such as Xilinx Virtex-II Pro PowerPCs, Xilinx Microblaze, Xilinx Picoblaze, Altera Nios, Altera ARM, etc.), etc. A signal processing circuit may also include one or more other types of devices and input/output devices including, but not limited to, analog/digital converters, digital/analog converters, RF receivers and distribution systems, sensor interfaces and arrays of such devices (e.g., such as antennas, microphones, geophones, hydrophones, magnetic sensors, RFIDs, etc.), wired network interfaces (e.g., such as Ethernet, Gigabit Ethernet, Universal Serial Bus (USB), Firewire, Infiniband, Serial and Parallel RapidIO, PCIe, Fibre Channel, optical interfaces, etc.), the Internet, wireless network interfaces (e.g., such as 802.11a, 802.11b, 802.11g, 802.11n, Multiple Input/Multiple Output (MIMO), Ultra-Wideband (UWB), etc.), bus interfaces (e.g., such as VME, PCI, ISA, Multibus, etc.), compute nodes (including both single and multiple sequential and parallel CPUs), human interface devices (e.g., video displays, manual entry devices, personal data assistants (PDAs), cell phones, Personal Computers (PCs), etc.), etc.

Although FIG. 13 illustrates each of signal processing circuits 1310, 1312, 1314 and 1316 as circuit cards, it will be understood any given signal processing circuit may be provided in any other suitable alternative form (e.g. not on a circuit card) for interconnection of a computing device with a high bandwidth interconnection medium, such as high bandwidth interconnection medium 1350.

Figure 14:
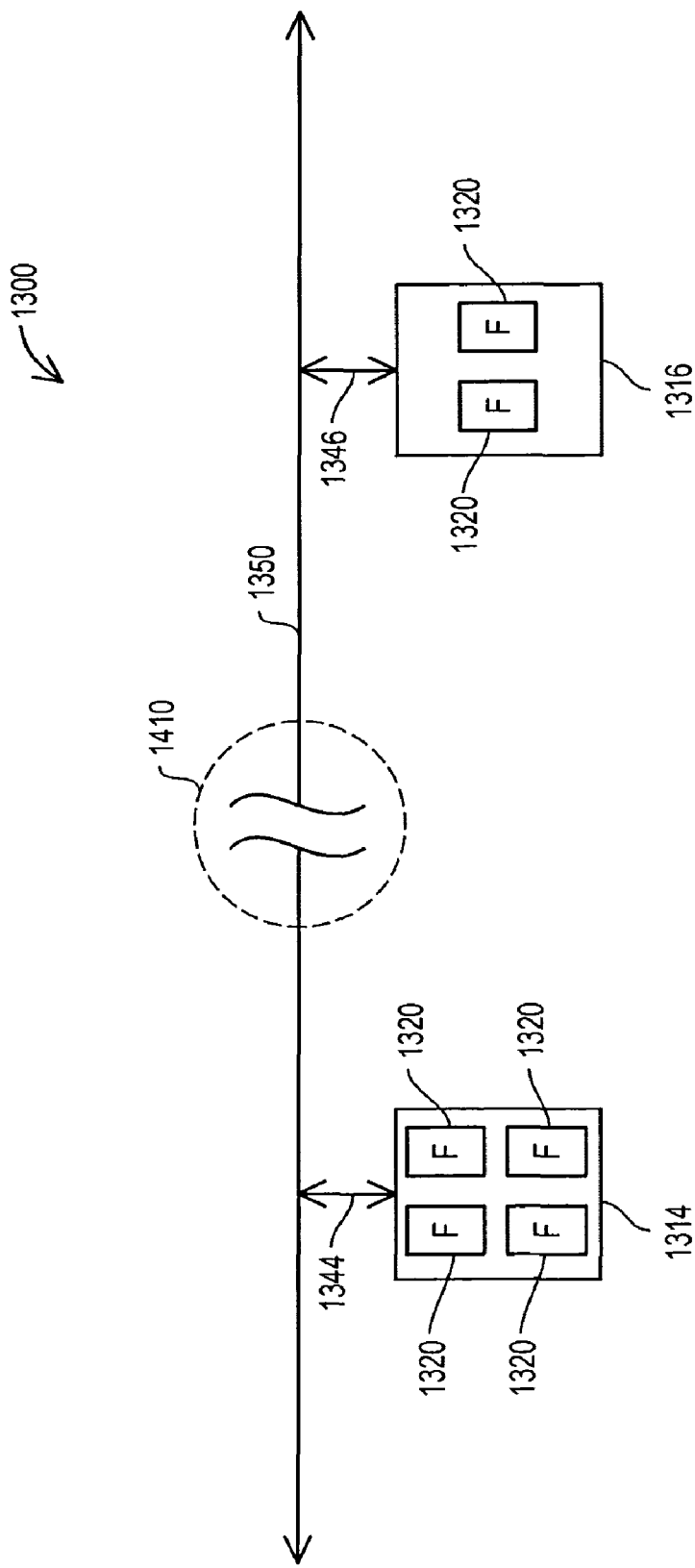
FIG. 14 illustrates a reconfigurable communications infrastructure according to one exemplary embodiment of the disclosed systems and methods.

In the practice of the disclosed systems and methods, any two or more computing devices that are physically segregated from each other may be interconnected as a part of a reconfigurable communications infrastructure to form a reconfigurable network. For example, FIG. 14 illustrates a reconfigurable communications infrastructure 1300 having high bandwidth interconnection medium 1350 interconnecting two signal processing circuits 1314 and 1316 that are physically segregated from each other as illustrated by a physical segregation point 1410 that is positioned therebetween. The physical segregation point 1410 may span any combination of interfaces to a high bandwidth interconnection medium able to extend the reconfigurable network over long distances or over a wide area, e.g., such as an interface to a bundle of multiplexed optical connections, a wireless network, or a specialized wired connection such as a telephone company trunk line. Examples of possible physical segregation points 1410 are the outer boundary of an electronics chassis or other electronics enclosure that contains one of signal processing circuits 1314 or 1316, the boundary between two rooms within a building, the boundary between two compartments of a vehicle, the interface to a wide-area network, etc. Although a physical segregation point is shown in FIG. 14, it will be understood that the disclosed systems and methods may be utilized to interconnect any two or more computing devices using a reconfigurable communications infrastructure that are not physically separated by a physical segregation point, e.g., such as two or more circuit cards provided within the same electronics chassis or provided adjacent to each other within the same enclosure, room or compartment.

In the practice of the disclosed systems and methods, any wired or wireless interconnection medium suitable for providing a high bandwidth interconnection between separate computing devices of a reconfigurable communications infrastructure may be employed, e.g., for the high bandwidth interconnection medium 1350 of FIGS. 13 and 14. In one exemplary embodiment, a high bandwidth interconnection may be an optical transmission medium, e.g., a fiber optic transmission medium that employs wave division multiplexing (WDM) or dense wave division multiplexing (DWDM) technology, fiber optic ribbon transmission medium that employs parallel optical fibers, etc. Other examples of optical transmission mediums include, but are not limited to, wireless optical transmission mediums such as free space optics (FSO) laser communications technology. Non-optical high bandwidth interconnection mediums may also be employed including, but not limited to, high bandwidth wired interconnection technologies such as Ethernet, Gigabit Ethernet, Universal Serial Bus (USB), Firewire, Infiniband, Serial and Parallel RapidIO, PCIe, Fibre Channel, etc., and high bandwidth radio frequency (RF) wireless interconnection technologies such as ultra-wideband wireless (UWB) technology, etc. In yet another embodiment, any interconnection medium (e.g., optical, wired or wireless interconnection medium) having a data transmission capability of greater than or equal to about 1 Gbps may be employed as a high bandwidth interconnection medium, although it will be understood that wired or wireless interconnection media having a data transmission capability of less than about 1 Gbps may alternatively be employed in other embodiments.

Suitable interface configurations that may be employed to implement the disclosed reconfigurable communications infrastructure configurations include, but are not limited to, the reconfigurable hardware architecture (RHA) embodiments illustrated and described in relation to FIGS. 1-12 herein. As described elsewhere herein, such embodiments may be employed to interconnect multiple ASIC devices (e.g., multiple FPGA devices) of a given reconfigurable signal processing circuit (e.g., such as may be implemented on a circuit card), and/or may be employed to interconnect multiple reconfigurable signal processing circuits (e.g., multiple circuit cards). Other examples of suitable interfacing schemes for interconnection of multiple reconfigurable signal processing circuits (e.g., circuit cards) include, but are not limited to, standard interfacing schemes such as Serial Rapid I/O, Parallel RapidIO, Infiniband, etc.

Figure 15:
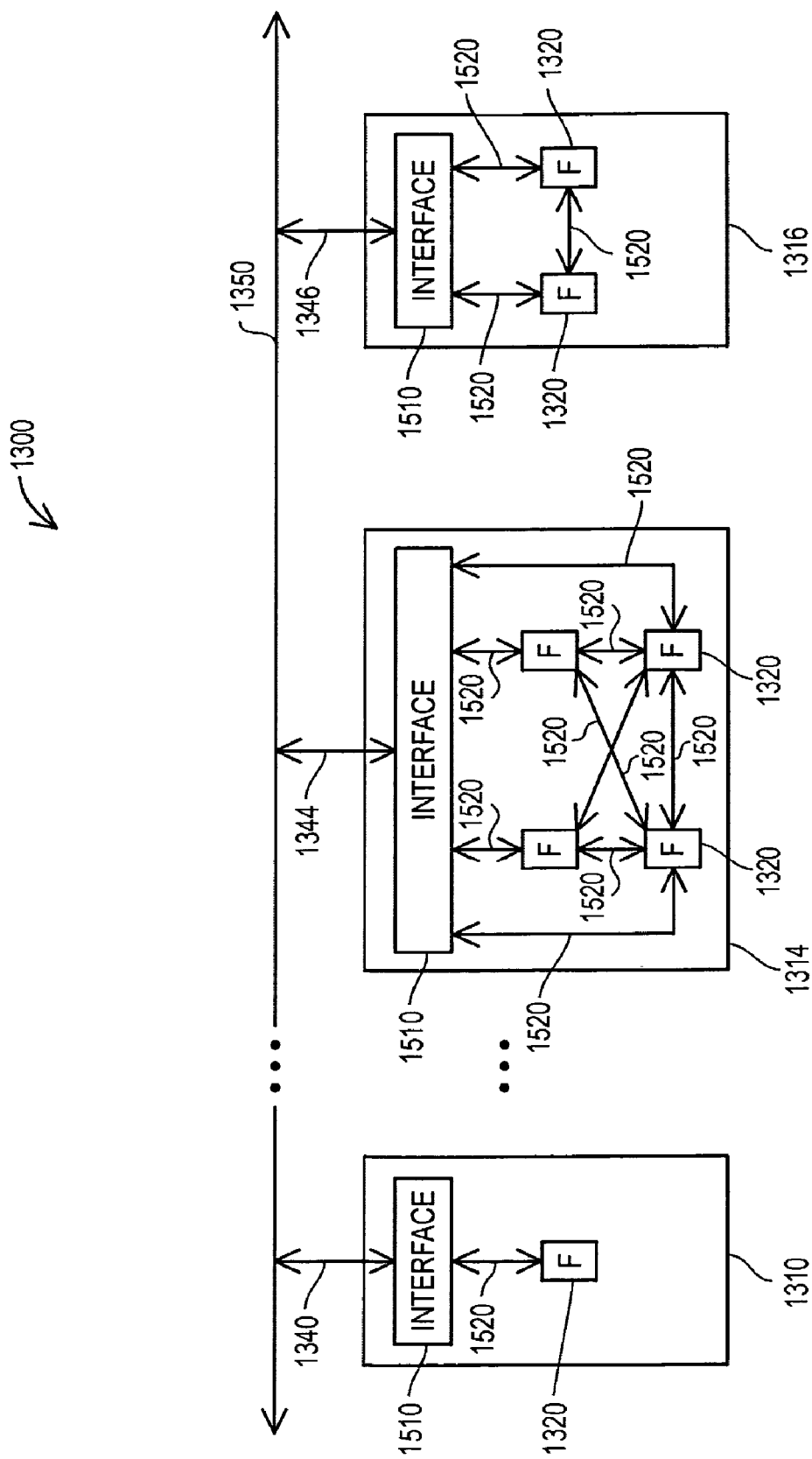
FIG. 15 illustrates a reconfigurable communications infrastructure according to one exemplary embodiment of the disclosed systems and methods.

FIG. 15 illustrates one exemplary embodiment of a reconfigurable communications infrastructure 1300 having reconfigurable signal processing circuits 1310, 1314 and 1316 that are interconnected by high bandwidth interconnection medium 1350, which in one exemplary embodiment may be a fiber optic transmission medium configured for transporting WDM or DWDM optical data communication. As shown in FIG. 15, reconfigurable signal processing circuit 1314 includes four FPGA devices that may be configured to communicate with each other in a manner as described for FPGA devices 102, 104, 106 and 108 of FIGS. 1-12 herein, i.e., with duplex serial data communication links 1520 provided between each given two of FPGA devices 102, 104, 106 and 108 (e.g., via high speed serial I/O connections in the form of MGTs), and with each FPGA being provided with a packet router interface switch matrix ("PRISM") to route packets between each of the individual FPGA devices via respective duplex serial data communication links 1520 as shown, as well as for intra-FPGA communications.

As further shown in FIG. 15, reconfigurable signal processing circuit 1314 also includes a high bandwidth interface 1510 coupled to provide high bandwidth bi-directional communication between high bandwidth interconnection medium 1350 and each FPGA device 1320 of reconfigurable signal processing circuit 1314. High bandwidth interface 1510 may be any interface that provides suitable data communication capability between each FPGA device 1320 and high bandwidth interconnection medium 135. For example, in an embodiment where high bandwidth interconnection medium 1350 is an optical data transmission medium, high bandwidth interface 1510 may be an electro-optical interface device such as a device configured according to the XENPAK Multi-Source Agreement (MSA), Fibre Channel, etc. In one exemplary embodiment, a reconfigurable signal processing circuit 1310, 1314 and/or 1316 may be configured as illustrated and described in relation to FIG. 1, in which case PMC interface site 124 of FIG. 1 may be configured as a high bandwidth interface 1510 (e.g., as an optical PMC communication device). However, it will be understood with benefit of this disclosure, that a reconfigurable signal processing circuit 1310, 1314 and/or 1316 may be provided with any other configuration of high bandwidth interface 1510 suitable for interconnecting FPGA devices 1320 with high bandwidth interconnection medium 1350.

Still referring to FIG. 15, each of reconfigurable signal processing circuits 1310 and 1316 are configured in a manner similar to reconfigurable signal processing circuit 1314, with the exception that reconfigurable signal processing circuit 1310 includes only a single FPGA device 1320 and signal processing circuit 1316 includes two FPGA devices 1320. It will be understood that the reconfigurable signal processing circuits of FIGS. 13-15 are exemplary only and that a reconfigurable signal processing circuit may include any number of FPGA and/or other ASIC devices that may be suitably interconnected using the systems and methods disclosed herein, including but not limited to three ASIC devices, five ASIC devices, six ASIC devices, etc. Furthermore, other types of computing and input/output devices may be present on a given signal processing circuit, and interconnected with one or more FPGA or other ASIC devices present on the same signal processing circuit, e.g., such as analog/digital converters, digital/analog converters, RF receivers and distribution systems, sensor interfaces and arrays of such devices (e.g., such as antennas, microphones, geophones, hydrophones, magnetic sensors, RFIDs, etc.), wired network interfaces (e.g., such as Ethernet, Gigabit Ethernet, Universal Serial Bus (USB), Firewire, Infiniband, Serial and Parallel RapidIO, PCIe, Fibre Channel, optical interfaces, etc.), the Internet, wireless network interfaces (e.g., such as 802.11a, 802.11b, 802.11g, 802.11n, Multiple Input/Multiple Output (MIMO), Ultra-Wideband (UWB), etc.), bus interfaces (e.g., such as VME, PCI, ISA, Multibus, etc.), compute nodes (including both single and multiple sequential and parallel CPUs), human interface devices (e.g., video displays, manual entry devices, PDAs, cell phones, Personal Computers (PCs), etc.), etc.

Each of FPGA devices 1320 of FIGS. 13-15 may be configured, for example, as shown and described for FPGA 700 FIG. 7, i.e., to include a PRISM router 702 that interconnects card-level interface/s 710, processor/s 712, user function/s 714, and inter-FPGA MGTs 704, and that may be configured to connect to MGTs 704, card-level interface/s 710, processor/s 712, and/or user-defined function/s 714 via source FIFO interfaces 720 and destination FIFO interfaces 721. In such a configuration, the PRISM infrastructure (i.e., that includes PRISM routers within each of FPGAs 1320) may be used to transfer data packets in a manner to interconnect an FPGA device 1320 of one of signal processing circuits 1310, 1314 and/or 1316 with an FPGA device 1320 of a different one of signal processing circuits 1310, 1314 and/or 1316 across high bandwidth interconnection medium 1350 of reconfigurable communications infrastructure 1300. The PRISM infrastructure may also be utilized to transfer data packets for intra-FPGA communications as described elsewhere herein. It will be understood that this configuration and methodology described below may be employed to interconnect other types of ASIC or other computing devices of separate signal processing circuits and/or combinations of FPGA devices with other types of ASIC or other computing devices.

Reconfigurable communications infrastructure 1300 of FIGS. 13-15 may be configured in one exemplary embodiment with a PRISM routing scheme that provides a duplex data communication link between each FPGA of a given signal processing circuit (e.g., circuit card) and high bandwidth interface 1510 (e.g., PMC interface site 124 of FIG. 1) with high bandwidth interconnection medium 1350. In such a configuration, a data packet may be routed from a given source of a source computing device (e.g., FPGA 1320) of a first reconfigurable signal processing circuit to a given destination of a destination computing device (e.g., a different FPGA 1320) of a second reconfigurable signal processing circuit using, for example, PRISM router and data packet configurations illustrated and described herein in relation to FIGS. 5, 6 and 7. However, it will be understood that any other data packet configuration and routing scheme suitable for allowing a sender or source to determine the packet's destination within a reconfigurable communications infrastructure 1300 may be employed (e.g., TCP/IP, Fibrechannel, XAUI, Ethernet, Infiniband, Rapid I/O, etc.). Further information on exemplary methodology and systems that may be employed for relaying data packets in the disclosed systems and methods may be found in U.S. patent application Ser. No. 11/600,935, entitled "METHODS AND SYSTEMS FOR RELAYING DATA PACKETS" by Yancey, et al. filed on the same date as the present application and which is incorporated herein by reference.

In one exemplary embodiment, the disclosed reconfigurable communications infrastructure may be implemented to provide increased inter-device connection bandwidth for board-level, box-level (i.e., chassis-level) and system-level configurations, e.g., by increasing allowable circuit board-to-circuit board physical separation, box-to-box physical separation and/or system-to-system physical separation. For example, communication bandwidths of at least about 200 megabits per second (e.g., alternatively from about 200 megabits per second to about 100 gigabits per second) may be achieved between individual computing devices (e.g., ASIC devices such as FPGA devices) physically separated by a distance of up to about 10 centimeters and alternatively physically separated by a distance of from about 5 centimeters to about 10 centimeters (e.g., computing devices positioned on the same circuit board); communication bandwidths of at least about 50 megabits per second (e.g., alternatively from about 50 megabits per second to about 100 gigabits per second) may be achieved between individual computing devices physically separated by a distance of up to about 1 meter and alternatively physically separated by a distance of from about 10 centimeters to about 1 meter (e.g., computing devices positioned on different circuit boards within a common box or chassis); and communication bandwidths of at least about 12 megabits per second (e.g., alternatively from about 12 megabits per second to about 100 gigabits per second) may be achieved between individual computing devices physically separated by a distance of up to about 100 meters and alternatively physically separated by a distance of from about 1 meter to about 100 meters (e.g., computing devices positioned in different compartments of a given vehicle or positioned in different rooms of given building). However, it will be understood that these bandwidths and distances are exemplary only and that in other embodiments greater and lesser bandwidths are possible at greater and lesser device-separation distances than given above.

Using the disclosed systems and methods, a reconfigurable communications infrastructure may be provided that allows dynamic real-time selection and interconnection of one or more individual reconfigurable signal processing circuits and/or selection and interconnection of one or more individual computing devices for executing a given computing task or computing tasks in a parallel and/or clustered manner. The reconfigurable nature of the disclosed communications infrastructure also allows for dynamic real-time re-selection of these selected reconfigurable signal processing circuits and/or individual computing devices for executing another given computing task or computing tasks in a parallel and/or clustered manner, and/or for dynamic real-time reassignment of individual reconfigurable signal processing circuits and/or individual computing devices to different computing clusters. In one embodiment, dynamic selection, reconfiguration, and interconnection may be achieved using the inter-computing device and intra-computing device capabilities of a packet router interface switch matrix ("PRISM") to route packets between each of the selected computing devices and/or between sources and destinations within the same selected computing devices in a manner as described elsewhere herein.

For example, referring to FIG. 13, one or more the distributed computing devices of each of reconfigurable signal processing circuits 1310, 1314 and 1316 may be selected and configured for together performing a first computing task as a first computing cluster, while the computing device of reconfigurable signal processing circuit 1312 performs another and separate (e.g., parallel) computing task or remains idle. In this regard, all of the computing devices of a given reconfigurable signal processing circuit may selected as a first computing cluster for performance of the first computing task, or only a portion of the computing devices on a given reconfigurable signal processing circuit may be selected as a first computing cluster for performing the first computing task. As an example of the latter case, FPGA device 1320 of reconfigurable signal processing circuit 1310 may be selected along with two of the FPGA devices 1320 of reconfigurable signal processing circuit 1314 and one of the FPGA devices 1320 of reconfigurable signal processing circuit 1316 as a first computing cluster for together performing the first computing task. In this case, the remaining two FPGA devices 1320 of reconfigurable signal processing circuit 1314 and the remaining FPGA device 1320 of reconfigurable signal processing circuit 1316 may be selected and configured as a second computing cluster for together performing a second computing task that may be optionally performed simultaneously and in parallel to the first computing task.

Upon completion of a given computing task (or at any other selected time), the identity of reconfigurable signal processing circuits and/or individual computing devices assigned to a given computing cluster may be optionally changed in real time. Referring to the previous example, upon completion of the first and second computing tasks, FPGA device 1320 of reconfigurable signal processing circuit 1310 may be selected along with three of the FPGA devices 1320 of reconfigurable signal processing circuit 1314 and one of the FPGA devices 1320 of reconfigurable signal processing circuit 1316 as a third computing cluster for together performing a third computing task, and the remaining FPGA device 1320 of reconfigurable signal processing circuit 1314 and the remaining FPGA device 1320 of reconfigurable signal processing circuit 1316 may be selected and configured as a fourth computing cluster for together performing a fourth computing task that may be optionally performed simultaneously and in parallel to the third computing task.

It will be understood that the above-described computing cluster examples are exemplary only and that any other suitable combination of two or more computing devices and/or two or more reconfigurable signal processing circuits may be selected for forming a computing cluster (e.g., a computing cluster for performing a common computing task or tasks) and/or for performing parallel or non-parallel computing tasks. It is also possible that all of the computing devices of all of the reconfigurable signal processing circuits of a given reconfigurable communications infrastructure may be combined into a single cluster for performing a single computing task, or that each separate individual computing device of a given reconfigurable communications infrastructure may be assigned a separate and different computing task to run in parallel with the other computing devices of the given reconfigurable communications infrastructure. Thus, a variety of combinations of computing devices and/or reconfigurable signal processing circuits are possible and dynamically reconfigurable using the disclosed systems and methods.

In the practice of the disclosed systems and methods, control for infrastructure configuration and reconfiguration (e.g., assignment and reassignment of reconfigurable signal processing circuits and/or individual computing devices to given computing tasks and/or computing clusters, configuration and reconfiguration of individual computing devices for different computing tasks, etc.) may be provided using any suitable methodology including, but not limited to, manual control via human input of commands, automatic control via a command signal received from one or more processing entities outside or within the reconfigurable communications infrastructure, combinations thereof, etc. For example, in one exemplary embodiment, illustrated in FIG. 13, infrastructure configuration and reconfiguration may be controlled via processor node 1312. In this embodiment, the configuration of each FPGA node (1320) in the network (1350) as well as the control program for each CPU node is provided by processor node 1312. Depending on the downloaded configuration, nodes may communicate with each other or with the control processor as required. The particular configuration of the network at any given time is determined by which configurations and/or programs are loaded onto the various network elements. This configuration may be changed dynamically, if desired, to accommodate changing conditions or processing requirements.

Figure 16:
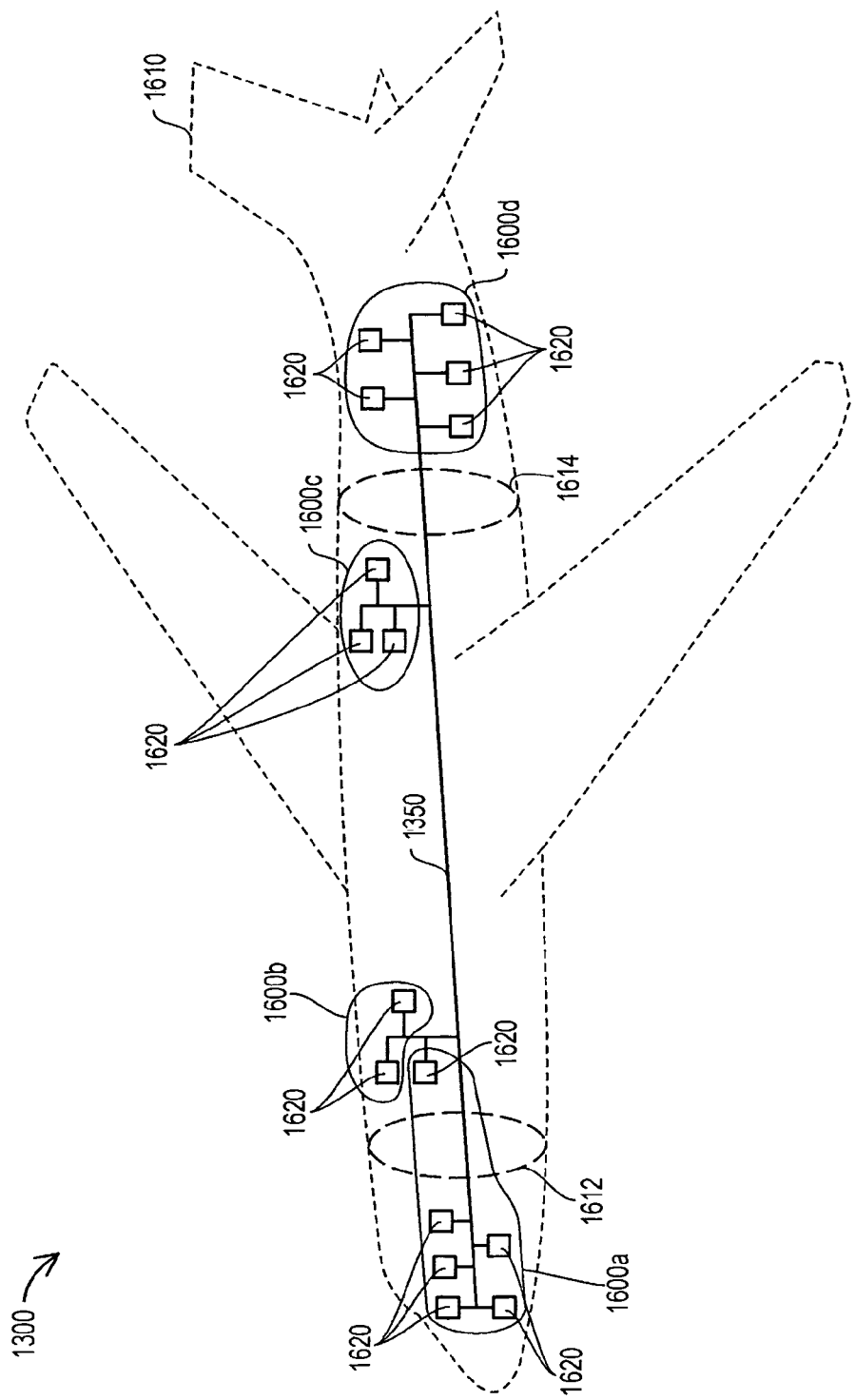
FIG. 16 illustrates a reconfigurable communications infrastructure according to one exemplary embodiment of the disclosed systems and methods.

FIG. 16 illustrates a reconfigurable communications infrastructure 1300 as it may be implemented in a vehicle-based application according to one exemplary embodiment of the disclosed systems and methods. In the exemplary embodiment of FIG. 16, an aircraft 1610 is shown configured with computing devices (e.g., ASIC devices such as reconfigurable FPGA devices) of multiple signal processing circuits 1620 that are interconnected by a high bandwidth interconnection medium 1350 to form a reconfigurable high bandwidth network within aircraft 1610. In such an embodiment, aircraft 1610 may be a weather surveillance aircraft (manned or unmanned) and signal processing circuits 1620 may be configured for processing of data collected from weather sensors on aircraft 1610, aircraft 1610 may be a communications aircraft (manned or unmanned) and signal processing circuits 1620 may be configured for processing (e.g., demodulation, beamforming, filtering) of communications data collected from radio frequency (RF) antenna sensors on aircraft 1610, etc.

As shown in FIG. 16, high bandwidth interconnection medium 1350 extends through bulkheads 1612 and 1614 that partition the inside of the fuselage of aircraft 1610 into multiple compartments. Thus, high bandwidth interconnection medium 1350 interconnects computing devices of signal processing circuits 1620 that are physically segregated from each other in separate compartments of aircraft 1610. In this embodiment, each of signal processing circuits 1620 may be configured, for example, in a manner as described and illustrated herein in relation to signal processing circuits 100, 1310, 1312, 1314, etc. In the illustrated embodiment of FIG. 16, signal processing circuits 1620 have been selected to form four computing clusters 1600a, 1600b, 1600c and 1600d within aircraft 1610. In such an embodiment, each computing cluster 1600 may be configured to perform a separate computing task in parallel or non-parallel manner with the other computing clusters.

Figure 17:
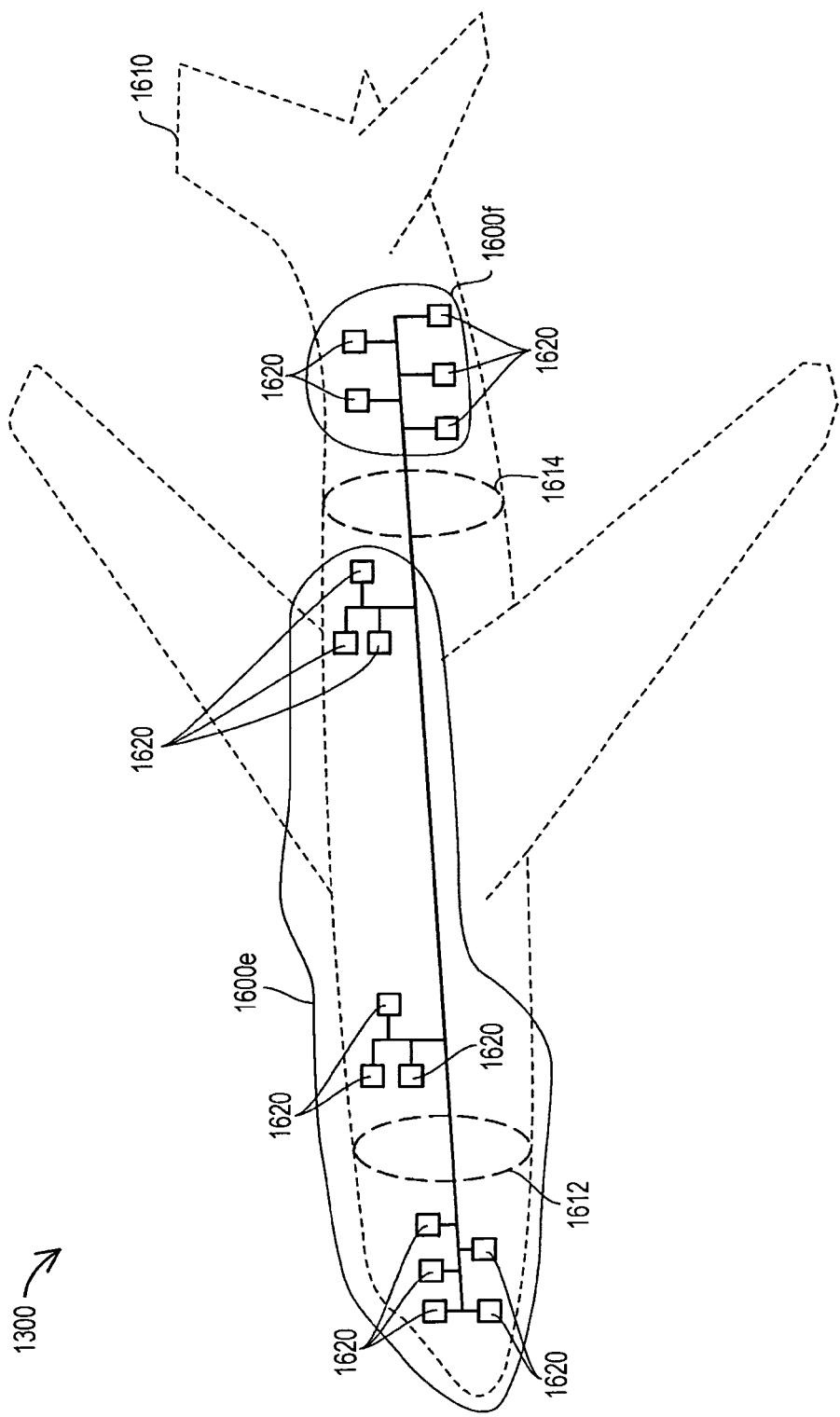
FIG. 17 illustrates a reconfigurable communications infrastructure according to one exemplary embodiment of the disclosed systems and methods.

FIG. 17 illustrates how vehicle-based reconfigurable communications infrastructure 1300 of FIG. 16 may be reconfigured (e.g., dynamically reconfigured during in-flight operations of aircraft 1610) so that signal processing circuits have been selected to form two computing clusters 1600e and 1600f within aircraft 1610. Once again, each computing cluster 1600e and 1600f may be configured to perform a separate computing task in parallel or non-parallel manner with the other computing clusters.

Figure 18:
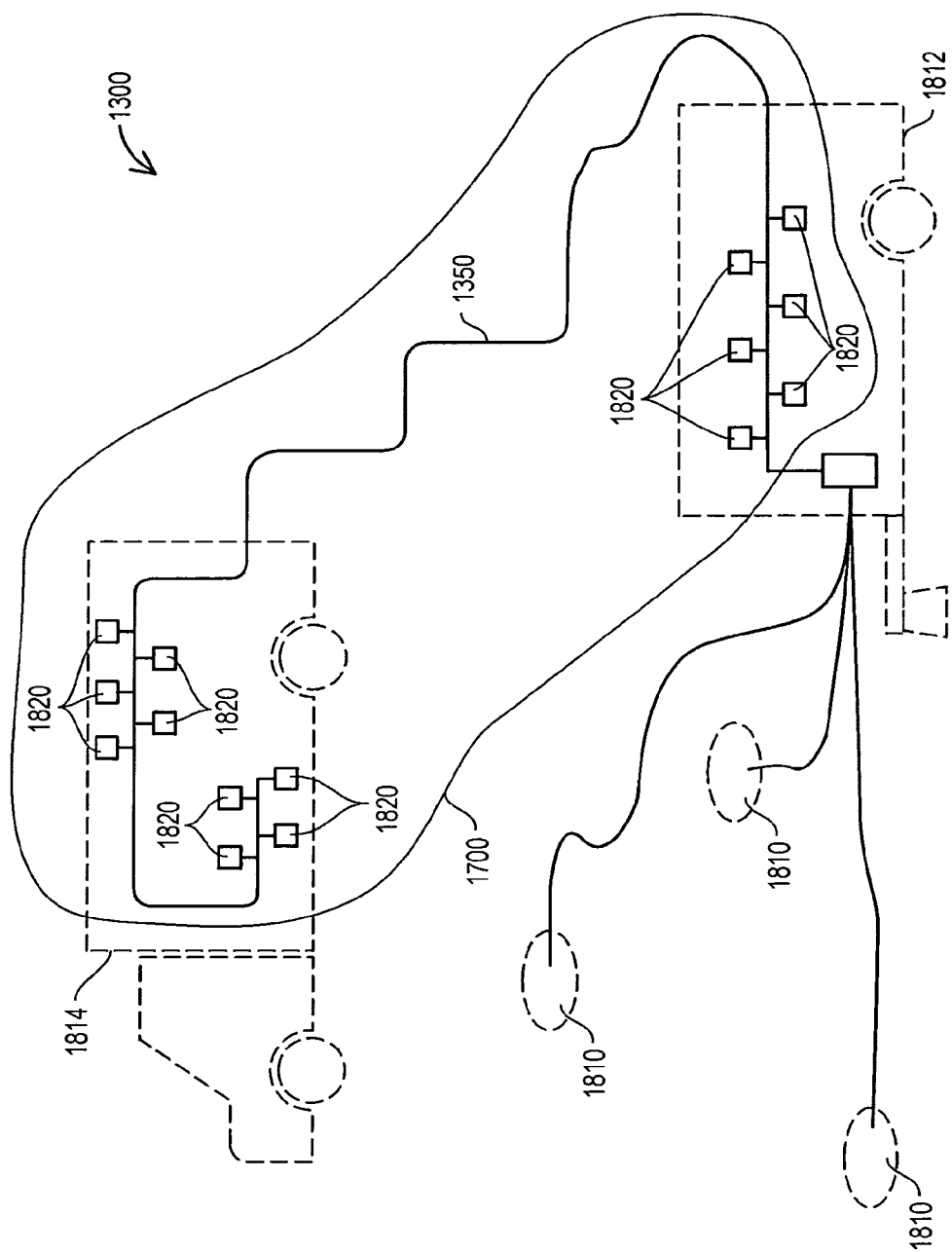
FIG. 18 illustrates a reconfigurable communications infrastructure according to one exemplary embodiment of the disclosed systems and methods.

FIG. 18 illustrates a reconfigurable communications infrastructure 1300 as it may be implemented in a vehicle-based application according to another exemplary embodiment of the disclosed systems and methods. In the exemplary embodiment of FIG. 18, a seismic data collection trailer 1812 and a seismic data processing truck 1814 is each shown configured with computing devices (e.g., ASIC devices such as reconfigurable FPGA devices) of multiple signal processing circuits 1820 that are interconnected by a high bandwidth interconnection medium 1350 to form a reconfigurable high bandwidth network.

As shown in FIG. 18, high bandwidth interconnection medium 1350 extends between truck 1814 and trailer 1812 so as to interconnect computing devices of signal processing circuits 1820 that are physically segregated from each other in separate vehicles. In this embodiment, each of signal processing circuits 1820 may be configured, for example, in a manner as described and illustrated herein in relation to signal processing circuits 100, 1310, 1312, 1314, etc. In the embodiment illustrated in FIG. 18, signal processing circuits 1820 have been selected to form a single computing cluster 1700, e.g., for collection and parallel processing of large amounts of data from geophones 1810 (e.g., using matrix arithmetic and with each of signal processing circuits 1820 processing data in parallel to the other signal processing circuits 1820) for multi-dimensional reconstruction of this collected data in the field.

It will be understood that the embodiments of FIGS. 16-18 are exemplary only and that multiple computing devices may be interconnected in a manner suitable for forming a reconfigurable communications infrastructure for use in any other suitable processing environment (e.g., other type of vehicle/s or building/s, etc.), and/or in manner suitable to perform other types of signal processing application/s.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. A method, comprising:
   providing two or more separate signal processing circuits, each one of said two or more signal processing circuits including multiple ASIC devices that each includes a respective packet router;
   providing a high bandwidth interconnection medium coupled between said signal processing circuits to form a reconfigurable communications infrastructure of said two or more signal processing circuits, the two or more signal processing circuits being selectively segregatable from each other, and the respective ASIC devices of each one of said two or more signal processing circuits being directly coupled to said high bandwidth interconnection medium by a respective common interface provided for the ASIC devices of each of said two or more signal processing circuits with no other processing device intervening between the high bandwidth interconnection medium and said respective ASIC devices; and
   selectively communicating data between said two or more signal processing circuits by selectively routing data through the packet router of each of the respective ASIC devices of each one of said signal processing circuits across a first common interface to the high bandwidth interconnection medium and to an other one of said signal processing circuits through a second common interface to the packet router of each of the respective ASIC devices of said other one of said signal processing circuits without routing said data through any other intervening processing device between each respective ASIC device and the high bandwidth interconnection medium.

2. The method of claim 1, wherein each of said ASIC devices of said two or more signal processing circuits is an FPGA device.

3. The method of claim 2, further comprising providing said two or more signal processing circuits in positions physically segregated from each other; and communicating data between said packet router of a respective one said FPGA devices of each of said two or more physically-segregated signal processing circuits across said first and second common interfaces and through said high bandwidth interconnection medium to the packet router of a respective FPGA device of an other one of said signal processing circuits without routing said data through any other intervening processing device between each respective FPGA device and the high bandwidth interconnection medium.

4. The method of claim 2, wherein each given one of said FPGA devices of one of said signal processing circuits comprises user-defined circuitry coupled to said respective packet router of said given one of said FPGA devices; and wherein said method further comprises transmitting and receiving data packets between said user-defined circuitry of said given one of said FPGA devices of one of said signal processing circuits and an other one of said FPGA devices of an other different one of said signal processing circuits across said first and second common interfaces and through said high bandwidth interconnection medium.

5. The method of claim 2, wherein each given one of said FPGA devices of one of said signal processing circuits comprises at least one embedded processor coupled to said respective packet router of said given one of said FPGA devices; and wherein said method further comprises transmitting and receiving data packets between said at least one embedded processor of said given one of said FPGA devices of one of said signal processing circuits and an other one of said FPGA devices of an other different one of said signal processing circuits across said first and second common interfaces and through said high bandwidth interconnection medium.

6. The method of claim 2, further comprising providing a vehicle-based reconfigurable communications infrastructure comprising a vehicle with each of said two or more signal processing circuits and said high bandwidth interconnection medium being positioned on or within said vehicle; and communicating data between said two or more signal processing circuits through said packet routers of each of said FPGA devices of said two or more signal processing circuits across said first and second common interfaces and through said high bandwidth interconnection medium on or within said vehicle.

7. The method of claim 3, wherein said two or more signal processing circuits are physically segregated from each other by at least one of being positioned in different rooms of a given building or facility from each other, or being positioned in different compartments of a given mobile vehicle from each other.

8. The method of claim 2, wherein said high bandwidth interconnection medium comprises an optical transmission medium; and wherein said method further comprises selectively communicating data between said two or more signal processing circuits by selectively routing data through the packet router of a respective FPGA device of each one of said two or more signal processing circuits across said first and second common interfaces and through said optical transmission medium to a respective FPGA device of an other different one of said signal processing circuits without routing said data through any other intervening processing device between each respective FPGA device and the high bandwidth interconnection medium.

9. The method of claim 2, further comprising selectively communicating data between said two or more signal processing circuits by selectively routing data through the packet router of a respective FPGA device of each one of said two or more signal processing circuits at a data transmission rate of greater than or equal to about 1 Gbps to a respective FPGA device of an other different one of said signal processing circuits without routing said data through any other intervening processing device between each respective FPGA device and the high bandwidth interconnection medium.

10. The method of claim 2, further comprising configuring each of said at least two separate signal processing circuits to perform different computing tasks in parallel.

11. The method of claim 2, wherein each of said signal processing circuits is a reconfigurable signal processing circuit that comprises two or more FPGA devices that each includes a packet router, said packet router of each one of said two or more FPGA devices of each given one of said signal processing circuits being coupled to each respective packet router of each of the other of said two or more FPGA devices of said same given one of said signal processing circuits; and wherein said method further comprises using said packet router of each given one of said two or more FPGA devices of each given one of said signal processing circuits; to communicate data packets within said given signal processing circuit by routing data packets to and from each other of said two or more FPGA devices of the same given one of said signal processing circuits without routing said data packets outside said given signal processing circuit across said first or second common interfaces to said high bandwidth interconnection medium.

12. The method of claim 11 wherein said packet router of each one of said two or more FPGA devices of each given one of said signal processing circuits is coupled to each respective packet router of each of the other of said two or more FPGA devices of same said same given one of said signal processing circuits by a separate respective duplex data communication link so as to form a direct serial interconnection between each two of said two or more FPGA devices of said same given one of said signal processing circuits; and wherein said method further comprises using said packet router of each given one of said two or more FPGA devices of said each given one of said signal processing circuits to transmit and receive data packets across each of said separate respective duplex data communication links existing between said given one of said two or more FPGA devices and each other of said two or more FPGA devices of the same given one of said signal processing circuits without routing said data packets outside said given signal processing circuit across said first or second common interfaces to said high bandwidth interconnection medium.

13. The method of claim 2, further comprising:
 providing said two or more separate signal processing circuits as a first signal processing circuit and a second signal processing circuit;

configuring said first and second signal processing circuits to perform a first computing task together as a first computing cluster;

providing at least two additional separate signal processing circuits as a third signal processing circuit including multiple FPGA devices and a fourth signal processing circuit including multiple FPGA devices, the first, second, third and fourth signal processing circuits being selectively segregatable from each other and each one of said respective FPGA devices of said third and fourth signal processing circuits being directly coupled to said high bandwidth interconnection medium by a respective common interface provided for the FPGA devices of each of said third and fourth signal processing circuits with no other processing device intervening between the high bandwidth interconnection medium and the FPGA devices of said respective third and fourth signal processing circuits;

dynamically configuring said third and fourth separate signal processing circuits in real time to perform a second computing task together as a second computing cluster, said second computing task being different than said first computing task; and simultaneously performing said first computing task with said first computing cluster and said second computing task with said second computing cluster.

14. The method of claim 13, further comprising:

dynamically reconfiguring said first and third separate signal processing circuits in real time to perform a third computing task together as a third computing cluster;

dynamically configuring said second and fourth separate signal processing circuits in real time to perform a fourth computing task together as a fourth computing cluster, said fourth computing task being different than said third computing task; and simultaneously performing said third computing task with said third computing cluster and said fourth computing task with said fourth computing cluster.

15. The method of claim 13, further comprising:

dynamically reconfiguring said first, second, third and fourth separate signal processing circuits in real time to perform a third computing task together as a third computing cluster; and performing said third computing task with said third computing cluster.

16. A reconfigurable communications infrastructure, comprising:

two or more separate signal processing circuits, each one of said two or more signal processing circuits including at multiple ASIC devices that each includes a respective packet router; and a high bandwidth interconnection medium coupled between said signal processing circuits to form said reconfigurable communications infrastructure of said two or more signal processing circuits, the two or more signal processing circuits being selectively segregatable from each other, and the respective ASIC devices of each one of said two or more signal processing circuits being directly coupled to said high bandwidth interconnection medium by a common interface provided for the ASIC devices of each of said two or more signal processing circuits with no other processing device intervening between the high bandwidth interconnection medium and said respective ASIC devices; and wherein the reconfigurable communications infrastructure is configured to selectively communicate data between said two or more signal processing circuits by selectively routing data through the packet router of each of the respective ASIC devices of each one of said signal processing circuits across a first common interface said high bandwidth interconnection medium to an other one of said signal processing circuits through a second common interface to the packet router of each of the respective ASIC devices of said other one of said signal processing circuits without routing said data through any other intervening processing device between each respective ASIC device and the high bandwidth interconnection medium.

17. The reconfigurable communications infrastructure of claim 16, wherein each of said ASIC devices of said two or more signal processing circuits is an FPGA device.

18. The reconfigurable communications infrastructure of claim 17, wherein each given one of said FPGA devices of one of said signal processing circuits comprises user-defined circuitry coupled to said respective packet router of said given one of said FPGA devices; and wherein said respective packet router of each given one of said FPGA devices of one of said signal processing circuits is configured to transmit and receive data packets between said user-defined circuitry of said given one of said FPGA devices of one of said signal processing circuits and an other one of said FPGA devices of an other different one of said signal processing circuits across said first and second common interfaces and through said high bandwidth interconnection medium.

19. The reconfigurable communications infrastructure of claim 17, wherein each given one of said FPGA devices of one of said signal processing circuits comprises at least one embedded processor coupled to said respective packet router of said given one of said FPGA devices; and wherein said respective packet router of each given one of said FPGA devices of one of said signal processing circuits is configured to transmit and receive data packets between said at least one embedded processor of said given one of said FPGA devices of one of said signal processing circuits and an other one of said FPGA devices of an other different one of said signal processing circuits across said first and second common interfaces and through said high bandwidth interconnection medium.

20. The reconfigurable communications infrastructure of claim 17, wherein said reconfigurable communications infrastructure is a vehicle-based reconfigurable communications infrastructure comprising a vehicle; and wherein each of said two or more signal processing circuits, first and second common interfaces, and said high bandwidth interconnection medium is positioned on or within said vehicle.

21. The reconfigurable communications infrastructure of claim 17, wherein said high bandwidth interconnection medium comprises an optical transmission medium.

22. The reconfigurable communications infrastructure of claim 17, wherein said high bandwidth interconnection medium comprises an interconnection medium having a data transmission capability of greater than or equal to about 1 Gbps.

23. The reconfigurable communications infrastructure of claim 17, wherein each of said signal processing circuits is a reconfigurable signal processing circuit that comprises two or more FPGA devices that each includes a packet router, said packet router of each one of said two or more FPGA devices of each given on of said signal processing circuits being coupled to each respective packet router of each of the other of said two or more FPGA devices of said same given one of said signal processing circuits; and wherein said packet router of each given one of said two or more FPGA devices of said signal processing circuits is configured to communicate data packets within said given signal processing circuit by routing data packets to and from each other of said two or more FPGA devices of the same given one of said signal processing circuits without routing said data packets outside said given signal processing circuit across said first or second common interfaces to said high bandwidth interconnection medium.

24. The reconfigurable communications infrastructure of claim 23, wherein said packet router of each one of said two or more FPGA devices of each given one of said signal processing circuits is coupled to each respective packet router of each of the other of said two or more FPGA devices of same said same given one of said signal processing circuits by a separate respective duplex data communication link so as to form a direct serial interconnection between each two of said two or more FPGA devices of said same given one of said signal processing circuits; and wherein said packet router of each given one of said two or more FPGA devices of each given one of said signal processing circuits is configured to communicate data packets within said given signal processing circuit by routing data packets to and from each other of said two or more FPGA devices of the same given one of said signal processing circuits without routing said data packets outside said given signal processing circuit across said first or second common interfaces to said high bandwidth interconnection medium.

25. The reconfigurable communications infrastructure of claim 17, wherein said two or more signal processing circuits are physically segregated from each other.

26. The reconfigurable communications infrastructure of claim 25, wherein said two or more signal processing circuits are physically segregated from each other by at least one of being positioned in different rooms of a given building or facility from each other, or being positioned in different compartments of a given mobile vehicle from each other.

27. A communications infrastructure, comprising two or more separate signal processing circuits, each one of said two or more signal processing circuits including multiple ASIC devices that each itself includes a packet router, said packet router of each one of said ASIC devices of each given one of said respective two or more signal processing circuits being coupled through respective first and second common interfaces and an intervening high speed serial optical link to a respective packet router of each of the ASIC devices of each other of said two or more signal processing circuits with no other processing device intervening between the high speed optical link and said ASIC devices of each of said two or more signal processing circuits.

28. The communications infrastructure of claim 27, wherein said interconnection further comprises a high bandwidth interconnection medium.

29. The communications infrastructure of claim 28, wherein each of said the ASIC devices of said two or more signal processing circuits is an FPGA device.

30. The communications infrastructure of claim 27, wherein said two or more signal processing circuits are physically segregated from each other by at least one of being positioned in different rooms of a given building or facility from each other, or being positioned in different compartments of a given mobile vehicle from each other.

31. A method, comprising:
providing two or more separate signal processing circuits, each one of said two or more signal processing circuits including multiple ASIC devices that each itself includes a packet router, said packet router of each one of said ASIC devices of each given one of said respective two or more signal processing circuits being coupled through respective first and second common interfaces and an intervening high speed serial optical link to a respective packet router of each of the other ASIC devices of each other of said two or more signal processing circuits with no other processing device intervening between the high speed serial optical link and said ASIC devices of each of said two or more signal processing circuits, and
selectively transferring at least one data packet from each said packet router of each one of said ASIC devices of each given one of said respective two or more signal processing circuits to each respective packet router of said at ASIC devices of each of the other of said two or more signal processing circuits through said first and second common interfaces and said intervening high speed serial optical link without routing said data through any other intervening processing device between each respective ASIC device and the high speed serial optical link.

32. The method of claim 31, wherein said two or more signal processing circuits are physically segregated from each other by at least one of being positioned in different rooms of a given building or facility from each other, or being positioned in different compartments of a given mobile vehicle from each other.

33. The method of claim 31, wherein said interconnection further comprises a high bandwidth interconnection medium.

34. The method of claim 33, wherein each of said ASIC devices of said two or more signal processing circuits is an FPGA device.

* * * * *